US010547411B2

(12) United States Patent
Beale

(10) Patent No.: US 10,547,411 B2
(45) Date of Patent: Jan. 28, 2020

(54) INFRASTRUCTURE EQUIPMENT, COMMUNICATIONS DEVICE AND METHODS

(71) Applicant: SONY CORPORATION, Tokyo (JP)

(72) Inventor: Martin Warwick Beale, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 172 days.

(21) Appl. No.: 15/554,200

(22) PCT Filed: Mar. 10, 2016

(86) PCT No.: PCT/EP2016/055082
§ 371 (c)(1),
(2) Date: Aug. 28, 2017

(87) PCT Pub. No.: WO2016/162162
PCT Pub. Date: Oct. 13, 2016

(65) Prior Publication Data
US 2019/0058544 A1 Feb. 21, 2019

(30) Foreign Application Priority Data

Apr. 10, 2015 (EP) .................................... 15163291

(51) Int. Cl.
*H04L 1/00* (2006.01)
*H04W 72/04* (2009.01)
*H04L 5/00* (2006.01)

(52) U.S. Cl.
CPC .......... *H04L 1/0013* (2013.01); *H04L 1/0067* (2013.01); *H04L 5/0053* (2013.01);
(Continued)

(58) Field of Classification Search
CPC combination set(s) only.
See application file for complete search history.

(56) References Cited

U.S. PATENT DOCUMENTS 9,008,035 B2 * 4/2015 Qu ........................ H04L 5/0016
370/330
2013/0044727 A1 * 2/2013 Nory ..................... H04L 5/0092
370/330
(Continued)

OTHER PUBLICATIONS

International Search Report dated Jun. 9, 2016 in PCT/EP2016/055082 filed Mar. 10, 2016.
(Continued)

*Primary Examiner* — Yee F Lam
(74) *Attorney, Agent, or Firm* — Xsensus, LLP

(57) ABSTRACT

An infrastructure equipment for a mobile communications network includes a transmitter and a receiver for transmitting and receiving signals via a wireless access interface to one or more communications devices. The infrastructure equipment is configured to identify, for each of plural time units, communications resource elements of a down-link communications channel which cannot be allocated to transmit messages to one of the communications devices, to determine, with respect to one of the plural time units as a reference time unit, a number of communications resource elements of the communications channel for repeatedly transmitting one or more message units to the communications device plural times in the reference time unit, to identify, for each of the plural time units, a pattern of the communications resource elements for the repeated transmission of the one or more message units, within each time unit, determined with respect to the reference time unit.

20 Claims, 18 Drawing Sheets

(52) U.S. Cl.
CPC ..... *H04W 72/042* (2013.01); *H04W 72/0446* (2013.01); *H04W 72/0453* (2013.01)

(56) References Cited

U.S. PATENT DOCUMENTS

| | | | |
|---|---|---|---|
| 2013/0194931 A1* | 8/2013 | Lee | H04L 5/0053 370/241 |
| 2014/0112304 A1* | 4/2014 | Shimizu | H04J 13/16 370/330 |
| 2015/0071201 A1* | 3/2015 | Larsson | H04L 5/001 370/329 |
| 2015/0365880 A1* | 12/2015 | Malladi | H04L 5/0007 370/312 |
| 2016/0338091 A1* | 11/2016 | Martin | H04L 5/003 |
| 2016/0345355 A1* | 11/2016 | Andersson | H04W 72/042 |
| 2017/0310429 A1* | 10/2017 | Wang | H04L 1/1854 |

OTHER PUBLICATIONS

Harri Holma, et al., LTE for UMTS: OFDMA and SC-FDMA Based Radio Access, 2009, 4 Pages.

"3$^{rd}$ Generation Partnership Project; Technical Specification Group Radio Access Network; Evolved Universal Terrestrial Radio Access (E-UTRA); Multiplexing and channel coding (Release 12)" 3GPP TS 36.212 V12.4.0, Mar. 2015, 94 Pages.

Sigen Ye, et al., "Enhanced Physical Downlink Control Channel in LTE Advanced Release 11" IEEE Communications Magazine, vol. 51, No. 2, Feb. 2013, 3 Pages (summary only).

"3$^{rd}$ Generation Partnership Project; Technical Specification Group Radio Access Network; Evolved Universal Terrestrial Radio Access (E-UTRA); Physical channels and modulation (Release 12)" 3GPP TS 36.211 V12.4.0, Dec. 2014, 124 Pages.

"3rd Generation Partnership Project; Technical Specification Group Radio Access Network; Evolved Universal Terrestrial Radio Access (E-UTRA); Physical layer procedures (Release 12)" 3GPP TS 36.213 V12.5.0, Mar. 2015, 239 Pages.

"3rd Generation Partnership Project; Technical Specification Group Radio Access Network; Study on provision of low-cost Machine-Type Communications (MTC) User Equipments (UEs) based on LTE (Release 12)" 3GPP TR 36.888 V12.0.0, Jun. 2013, 55 Pages.

Erik Dahlman, et al., 4G LTE/LTE-Advanced for Mobile Broadband, 2011, 7 Pages (summary only).

Alcatel Lucent, et al., "Coverage enhancement for PBCH" 3GPP TSG-RAN WG1 Meeting #76 R1-140151, XP050735714, Feb. 2014, 3 Pages.

Intel Corporation, "Discussion on SCH, PBCH and PRACH enhancement for eMTC" 3GPP TSG RAN WG1 Meeting #78bis R1-143773, XP050875094, Oct. 2014, 8 Pages.

MediaTek Inc., "Text Proposal on Section 9.5 Analysis of Physical Channels and Signals" 3GPP TSG-RAN WG1 #72bis R1-131183, XP050697100, Apr. 2013, 8 Pages.

European Office Action dated Nov. 2, 2018, issued in European Patent Application No. 16 712 248.0.

* cited by examiner

Radio frame containing the maximum number of MBSFN subframes

Example subframe containing CSI-RS for an eNodeB transmitting using 4 antenna ports Flow chart of operation of rate matching when applied to subframes containing CSI-RS Flow chart of operation of rate matching when applied to subframes containing CSI-RS Localised and distributed forms of ePDCCH Mapping of eREGs to Res Example resource element mapping for ePDCCH in a subframe containing CRS, legacy control channels, DMRS and CSI-RS Example resource element mapping for ePDCCH in an MBSFN subframe without CRS, CSI-RS Subframes to which a repeated ePDCCH is mapped Example mapping of ePDCCH modulation symbols to resource elements for subframes 1,2,3,7

Example mapping of ePDCCH modulation symbols to resource elements for subframes 0,4,5

Example mapping of ePDCCH modulation symbols to resource elements for subframe 6

| Modulation symbol, $Y_1$ | Number of repetitions | Present in subframes |
|---|---|---|
| $Y_0$ | 8 | 0,1,2,3,4,5,6,7,8 |
| $Y_1$ | 8 | 0,1,2,3,4,5,6,7,8 |
| $Y_2$ | 8 | 0,1,2,3,4,5,6,7,8 |
| $Y_3$ | 8 | 0,1,2,3,4,5,6,7,8 |
| $Y_4$ | 5 | 1,2,3,6,7 |
| $Y_5$ | 8 | 0,1,2,3,4,5,6,7,8 |
| $Y_6$ | 8 | 0,1,2,3,4,5,6,7,8 |
| $Y_7$ | 5 | 1,2,3,6,7 |
| $Y_8$ | 7 | 0,1,2,3,4,5,7,8 |
| $Y_9$ | 7 | 0,1,2,3,4,5,7,8 |
| $Y_{10}$ | 7 | 0,1,2,3,4,5,7,8 |
| $Y_{11}$ | 7 | 0,1,2,3,4,5,7,8 |
| $Y_{12}$ | 8 | 0,1,2,3,4,5,6,7,8 |
| $Y_{13}$ | 5 | 1,2,3,6,7 |
| $Y_{14}$ | 8 | 0,1,2,3,4,5,6,7,8 |
| $Y_{15}$ | 8 | 0,1,2,3,4,5,6,7,8 |
| $Y_{16}$ | 8 | 0,1,2,3,4,5,6,7,8 |
| $Y_{17}$ | 8 | 0,1,2,3,4,5,6,7,8 |
| $Y_{18}$ | 8 | 0,1,2,3,4,5,6,7,8 |
| $Y_{19}$ | 8 | 0,1,2,3,4,5,6,7,8 |
| $Y_{20}$ | 8 | 0,1,2,3,4,5,6,7,8 |
| $Y_{21}$ | 8 | 0,1,2,3,4,5,6,7,8 |
| $Y_{22}$ | 8 | 0,1,2,3,4,5,6,7,8 |
| $Y_{23}$ | 8 | 0,1,2,3,4,5,6,7,8 |
| $Y_{24}$ | 8 | 0,1,2,3,4,5,6,7,8 |
| $Y_{25}$ | 5 | 1,2,3,6,7 |
| $Y_{26}$ | 8 | 0,1,2,3,4,5,6,7,8 |
| $Y_{27}$ | 8 | 0,1,2,3,4,5,6,7,8 |

FIG. 17

INFRASTRUCTURE EQUIPMENT, COMMUNICATIONS DEVICE AND METHODS

CROSS-REFERENCE TO RELATED APPLICATIONS

The present application is based on PCT filing PCT/EP2016/055082 filed Mar. 10, 2016, and claims priority to European Patent Application 15 163 291.6, filed in the European Patent Office on Apr. 10, 2015, the entire contents of each of which being incorporated herein by reference.

BACKGROUND

Field of Disclosure

Technical Field of the Disclosure

The present disclosure relates to infrastructure equipment for mobile communications networks, communications devices configured to communicate using mobile communications networks and methods for communicating with communications devices. In some embodiments a wireless access interface provided by the mobile communications network is configured to extend a radio communications system's coverage by transmitting messages repeatedly to the communications devices.

BACKGROUND OF THE DISCLOSURE

Mobile communications system such as those which are being developed in accordance with the Long Term Evolution (LTE) project by the Third Generation Project Partnership (3GPP) can provide a facility for communications devices to transmit or receive data for a variety of applications with high data rates within a radio coverage area provided by a mobile communications network. A wireless access interface provided by the mobile communications network configured in accordance with an LTE standard includes signal transmission techniques which can support these high data rates. There is therefore expected to be a variety of applications, which can be supported by an LTE system.

Although there are applications which require high data rates to support their operation, there are some applications in which high data rates are not required. Indeed there are some applications which are expected to be provided by more simple, less complicated communications devices such as those supporting machine type communications (MTC). Such devices are also expected to be low power devices and may include a relatively inexpensive low complexity transmitter and receiver. Such devices may also be deployed in locations in which radio communications conditions for the transmission and reception of signals can be more difficult.

A technique which has been proposed to improve a likelihood of communications devices to receive signals transmitted by a mobile communications network using an existing transmission format is to repeat a transmission of a signal representing a message from a mobile communications network. A receiver can combine the repeatedly received message to improve a likelihood of correctly detecting the message. Therefore a mobile communications network can be arranged to extend its radio coverage, particularly for less complicated mobile communications devices. Such a technique is known as coverage extension. However introducing such coverage extension techniques for a wireless access interface which is configured with communications resource elements which have been allocated for other purposes can make the use of such coverage extension techniques difficult.

SUMMARY OF THE DISCLOSURE

According to a first example embodiment of the present technique there is provided an infrastructure equipment for a mobile communications network comprising, a transmitter configured to transmit signals to one or more communications devices via a wireless access interface comprising a plurality of communications resource elements, and a receiver configured to receive signals from the one or more communications devices via the wireless access interface. A controller is configured to control the transmitter and the receiver to transmit the signals to the one or more communications devices and to receive the signals from the one or more communications devices. The wireless access interface comprises a down-link communications channel in which each of a plurality of time divided units comprises communications resource elements in time and frequency for allocation to transmit messages to the communications devices. The time units may be formed for example from subframes of a time divided frame, the communications resources comprising sub-carriers of OFDM symbols, so the communications resource elements provide modulations symbol in time and frequency. The controller is configured to identify, for each of a plurality of time units, communications resource elements of the communications channel which cannot be allocated to transmit messages to one of the communications devices. For example some time units may include resource elements allocated for transmitting reference symbols such as DMRS and CSI-RS according to an example of an LTE wireless access interface. Furthermore these resource elements, which are allocated for other purposes and so cannot be used may change from one time slot to another (or from one subframe to another). The controller is configured to determine, with respect to one of the plurality of time units as a reference time unit, a number of the communications resource elements of the communications channel for repeatedly transmitting one or more message units to the communications device a plurality of times in the reference time unit, in order to provide coverage extension for example, to identify, for each of the plurality of time units, a pattern of the communications resource elements for the repeated transmission of the one or more message units, within each time unit, determined with respect to the reference time unit, the pattern of the communications resource elements for each of the plurality of time units excluding the communications resource elements of the communications channel which cannot be allocated to the communications devices, and to control the transmitter to transmit the one or more message units to the communications device via the identified pattern of the communications resource elements in the plurality of time units of the wireless access interface.

According to the present technique, an infrastructure equipment can be arranged to identify a pattern of communications resource elements for performing repeated transmission of one or more message units to provide coverage extension for communications devices. The pattern accommodates pre-allocated communications resource elements which have been specified for a different purpose in one or more of the time units, so that these communications resource elements cannot be used for transmitting the one or more message units, and in which these allocated resource elements change from one time unit to another.

According to some embodiments the pattern of communications resource elements allocated for repeatedly transmitting the one or more message units is defined with respect to a reference pattern for a particular time unit or reference time unit or subframe. The reference unit may be predetermined in accordance with a specification of a mobile communications system or may be determined dynamically. Various further aspects and features of the present disclosure are defined in the appended claims and include a communications device and a method of communicating using a communications device.

BRIEF DESCRIPTION OF DRAWINGS

Embodiments of the present disclosure will now be described by way of example only with reference to the accompanying drawings wherein like parts are provided with the same reference numerals and in which:

FIG. 17 provides an example of a table representing the allocation of resource elements, which are used for configuring an ePDCCH with repeated transmission to provide coverage extension;

DESCRIPTION OF EXAMPLE EMBODIMENTS

Conventional Communications System

Figure 1:
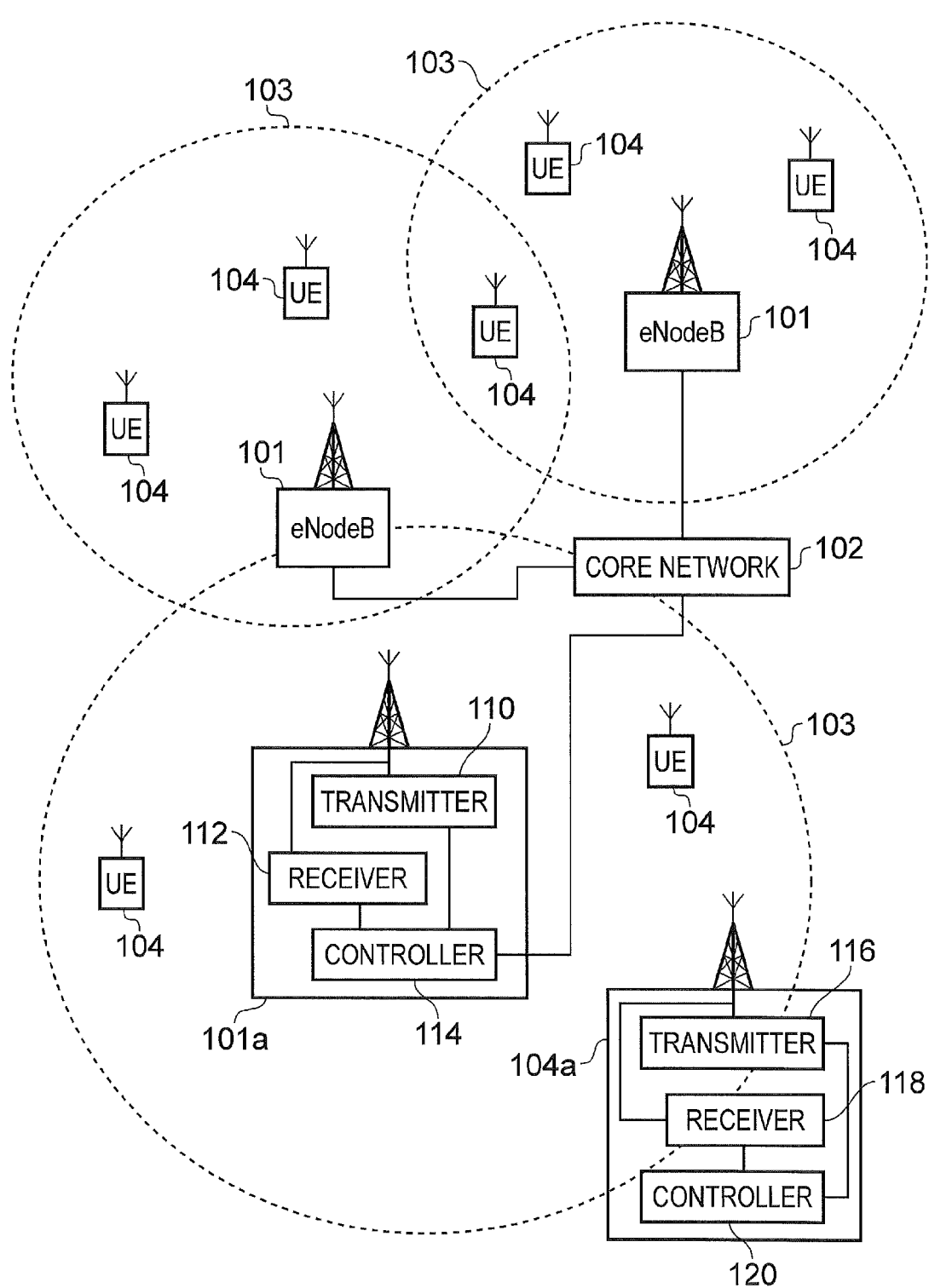
FIG. 1 provides a schematic block diagram of a mobile communications system in which communications devices are communicating via infrastructure equipment.

FIG. 1 provides a schematic diagram illustrating some basic functionality of a mobile telecommunications network/system operating in accordance with LTE principles and which may be adapted to implement embodiments of the disclosure as described further below. Various elements of FIG. 1 and their respective modes of operation are well-known and defined in the relevant standards administered by the 3GPP® body, and also described in many books on the subject, for example, Holma H. and Toskala A [1]. It will be appreciated that operational aspects of the telecommunications network which are not specifically described below may be implemented in accordance with any known techniques, for example according to the relevant standards.

FIG. 1 provides a schematic diagram of a mobile telecommunications system, where the system includes infrastructure equipment comprising base stations 101 which are connected to a core network 102, which operates in accordance with a conventional arrangement which will be understood by those acquainted with communications technology. The infrastructure equipment 101 may also be referred to as a base station, network element, enhanced Node B (eNodeB) or a coordinating entity for example, and provides a wireless access interface to the one or more communications devices within a coverage area or cell represented by a broken line 103. One or more mobile communications devices 104 may communicate data via the transmission and reception of signals representing data using the wireless access interface. The core network 102 may also provide functionality including authentication, mobility management, charging and so on for the communications devices served by the network entity.

The mobile communications devices of FIG. 1 may also be referred to as communications terminals, user equipment (UE), terminal devices and so forth, and are configured to communicate with one or more other communications devices served by the same or a different coverage area via the network entity. These communications may be performed by transmitting and receiving signals representing data using the wireless access interface over the two way communications links.

The communications system may operate in accordance with any known protocol, for instance in some examples the system may operate in accordance with a 3GPP Long Term Evolution (LTE) standard.

As shown in FIG. 1, one of the eNodeBs 101a is shown in more detail to include a transmitter 110 for transmitting signals via a wireless access interface to the one or more communications devices or UEs 104, and a receiver 112 to receive signals from the one or more UEs within the coverage area 103. A controller 114 controls the transmitter 110 and the receiver 112 to transmit and receive the signals via the wireless access interface. The controller 114 may perform a function of controlling the allocation of communications resource elements of the wireless access interface and may in some examples include a schedule for scheduling transmissions via the wireless access interface for both an uplink and a downlink.

An example UE 104a is shown in more detail to include a transmitter 116 for transmitting signals on the uplink of the wireless access interface to the eNodeB 101 and a receiver 118 for receiving signals transmitted by the eNodeB 101 on the downlink via the wireless access interface. The transmitter 116 and the receiver 118 are controlled by a controller 120.

LTE Wireless Access Interface

Mobile telecommunications such as those arranged in accordance with the 3GPP defined Long Term Evolution (LTE) architecture use an orthogonal frequency division modulation (OFDM) based wireless access interface for the radio downlink (so-called OFDMA) and a single carrier frequency division multiple access scheme (SC-FDMA) on the radio uplink. The down-link and the up-link of a wireless access interface according to an LTE standard is presented in FIGS. 2 and 3.

Figure 2:
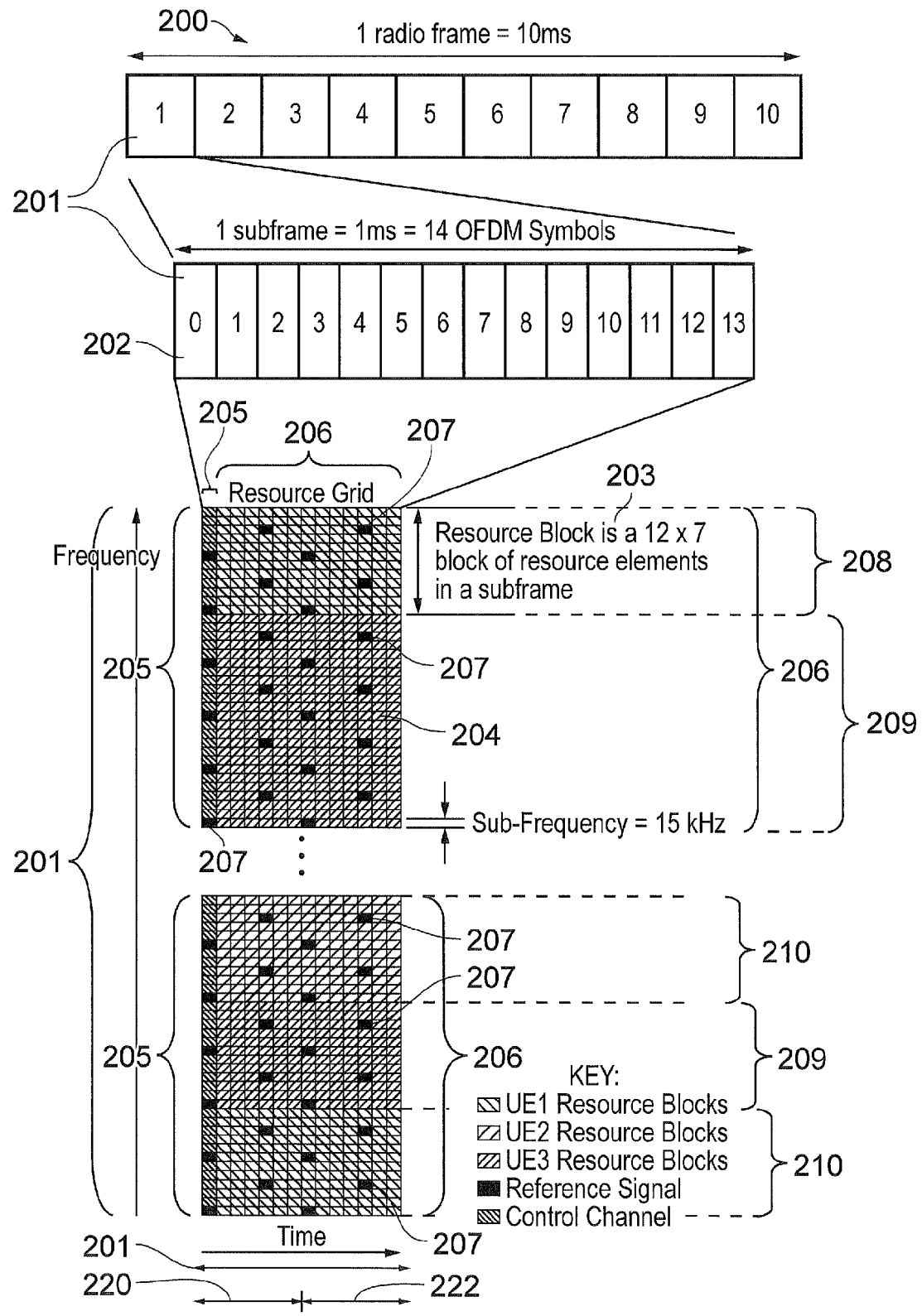
FIG. 2 provides a schematic diagram of a structure of a downlink of a wireless access interface of a mobile communications systems operating according to an LTE standard.

FIG. 2 provides a simplified schematic diagram of the structure of a downlink of a wireless access interface that may be provided by or in association with the eNodeB of FIG. 1 when the communications system is operating in accordance with the LTE standard. In LTE systems the wireless access interface of the downlink from an eNodeB to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.4 MHZ and 20 MHz bandwidth may be divided into orthogonal subcarriers. Not all of these subcarriers are used to transmit data (some are used for features such as the cyclic prefix of the OFDM symbols). The number of subcarriers varies between 72 subcarriers (1.4 MHz) and 1200 subcarriers (20 MHz). In some examples the subcarriers are grouped on a basis of $2^n$, for example 128 to 2048, so that both a transmitter and a receiver can use an inverse and a forward Fast Fourier Transform to convert the sub-carriers from the frequency domain to the time domain and from the time domain to the frequency domain respectively. Each subcarrier bandwidth may take any value but in LTE it is fixed at 15 kHz. As shown in FIG. 2, the resources of the wireless access interface are also temporally divided into frames where a frame 200 lasts 10 ms and is subdivided into 10 subframes 201 each with a duration of 1 ms. Each subframe 201 is formed from 14 OFDM symbols and is divided into two slots 220, 222 each of which comprise six or seven OFDM symbols depending on whether a normal or extended cyclic prefix is being utilised between OFDM symbols for the reduction of inter symbol interference. The resources within a slot may be divided into resources blocks 203 each comprising 12 subcarriers for the duration of one slot and the resources blocks further divided into resource elements 204 which span one subcarrier for one OFDM symbol, where each rectangle 204 represents a resource element. More details of the down-link structure of the LTE wireless access interface are provided in Annex 1. However of particular relevance in understanding the example embodiments of the present technique are the downlink control channel referred to as the physical downlink control channel (PDCCH) and a shared channel of resources for transmitting data to UEs which is the physical downlink shared channel (PDSCH).

Figure 3:
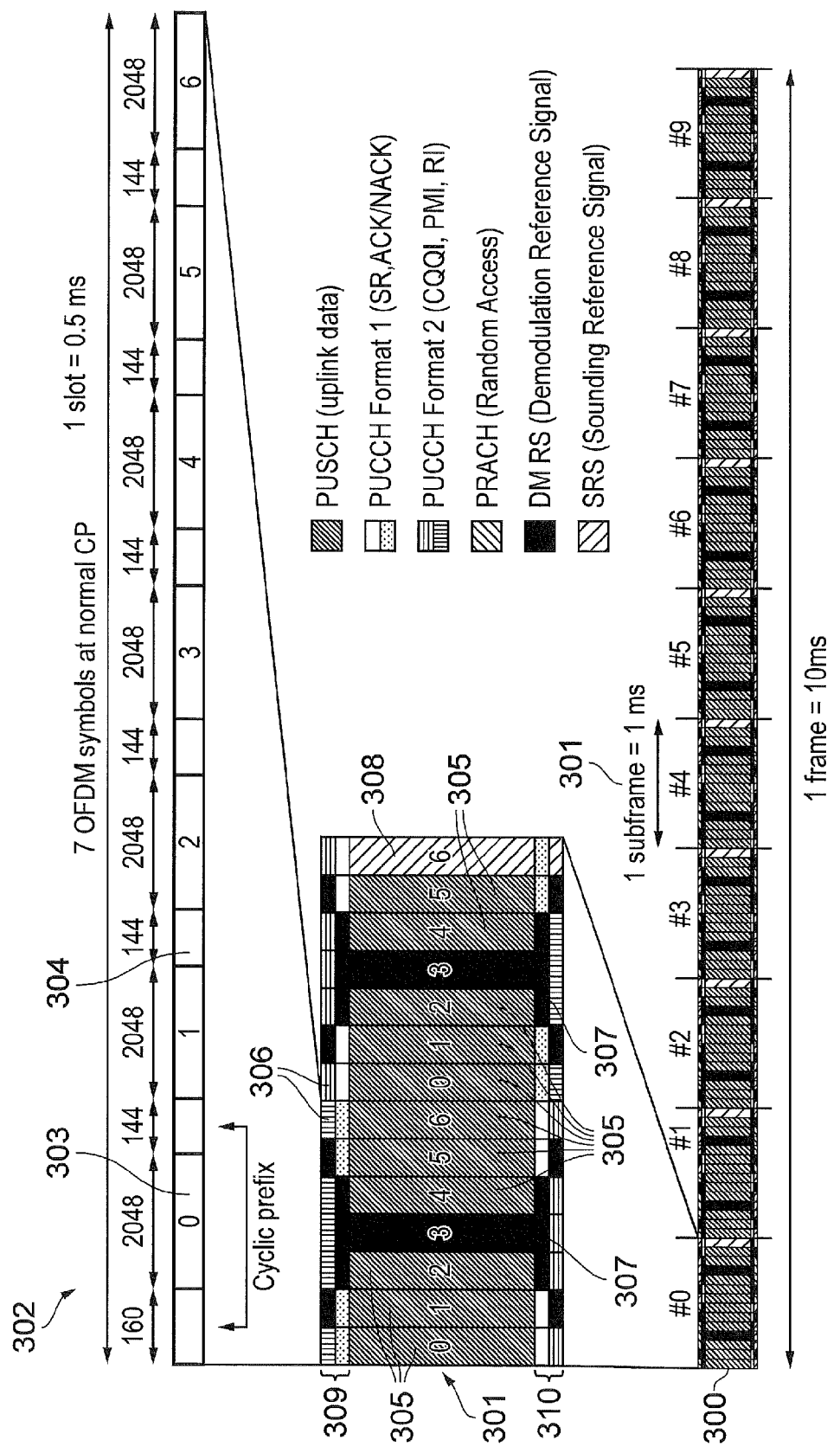
FIG. 3 provides a schematic diagram of an uplink of a wireless access interface of a mobile communications system operating according to an LTE standard.

FIG. 3 provides a simplified schematic diagram of the structure of an uplink of an LTE wireless access interface that may be provided by or in association with the eNodeB of FIG. 1. In LTE networks the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations subframes switch between uplink and downlink subframes in accordance with predefined patterns. However, regardless of the form of duplexing used, a common uplink frame structure is utilised. The simplified structure of FIG. 3 illustrates such an uplink frame in an FDD implementation. A frame 300 is divided in to 10 subframes 301 of 1 ms duration where each subframe 301 comprises two slots 302 of 0.5 ms duration. Each slot is then formed from seven OFDM symbols 303 where a cyclic prefix 304 is inserted between each symbol in a manner equivalent to that in downlink subframes. More details of the LTE up-link represented in FIG. 3 are provided in Annex 1.

Coverage Extension by Repeated Transmission

Embodiments of the present technique find applications in which coverage extension is used within a mobile communications system by repeating the transmission of a message unit. The message unit could be carrying the data in the form of a data packet or datagram or could be a control channel message. Thus applications of the present technique can be for a control channel such as a PDCCH or an ePDCCH as mentioned above or a data channel such as a shared channel such as a PDSCH as described above with reference to FIG. 2. Embodiments of the present technique therefore find application where coverage extension is employed by repeated transmission in order to reach either low capability UEs (e.g. with a single receive antenna or a higher noise figure receiver amplifier) or remotely located UEs and in which some of the communications resource elements within some frames or subframes cannot be used because these are already allocated for other purposes. An example application to LTE communications systems will be used as an illustrative example. For the example of LTE then resource elements may be allocated in a sub-frame for other purposes. For example, in some sub-frames resource elements are pre-allocated for the transmission of Cell-specific Reference Symbols (CRS) or Channel State Information Reference Symbols (CSI-RS) and so cannot be allocated for performing repeat transmission of a message unit. In contrast, subframes of MBSFN type would not contain any CRS in the data region and may not contain CSI-RS either. A more detailed explanation of these examples is provided in the following sections.

It is known that for machine to machine type applications, such as an LTE standard as proposed within the 3GPP, an enhanced Physical Downlink Control Channel (ePDCCH)

may be utilised. The enhanced PDCCH corresponds functionally to a conventional PDCCH as described above, but comprises a limited number of subcarriers and a large number of OFDM symbols. This is in contrast to the conventional PDCCH, which is shown in FIG. 2, stretches across the entire downlink frequency band 205, but now in time comprises only one, two or three of the first OFDM symbols of a subframe.

The radio transmission coverage of the ePDCCH can be extended by repetition across subframes. There are two alternative methods for repetition across subframes. A first is achieved by coding the ePDCCH onto a single subframe and then repeating that subframe a number of times. A second repeat transmission is implemented by coding the ePDCCH onto an aggregation of repeated subframes. In the first method, when the ePDCCH is repeated across subframes, the same coded bits are transmitted in each subframe. The present technique finds application with this first example technique of coding the ePDCCH.

As indicated above, some versions of LTE standards proposed by 3GPP, such as the Release-8 specifications include support for the Cell-specific Reference Signals (CRS). These reference signals occupy known locations in every subframe of the frame. For the example of Release-10 of the LTE specifications, some further enhancements introduce so called "LTE-Advance" (LTE-A) features. Two of the features included in LTE-A were:
  channel state information reference signals (CSI-RS)
  operation in MBSFN subframes These features will be briefly explained in the following sections:

MBSFN Subframes
  An MBSFN subframe contains:
  a legacy control channel region containing PDCCH/PH-ICH/PCFICH
  cell specific reference signals (CRS) only in a conventional control channel region (PDCCH)

Figure 4:
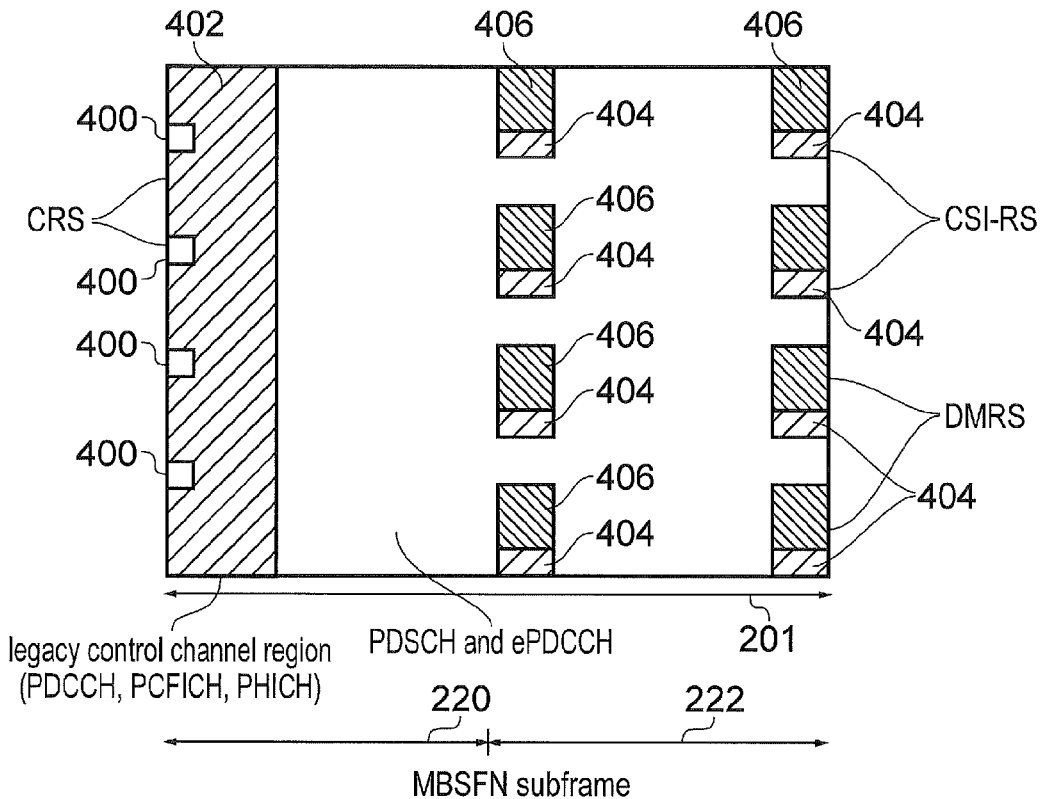
FIG. 4 provides a schematic diagram of a subframe of the downlink of the wireless access interface shown in FIG. 2, which is configured as a "Multimedia Broadcast Single Frequency Network" (MBSFN) type subframe.
Figure 5:
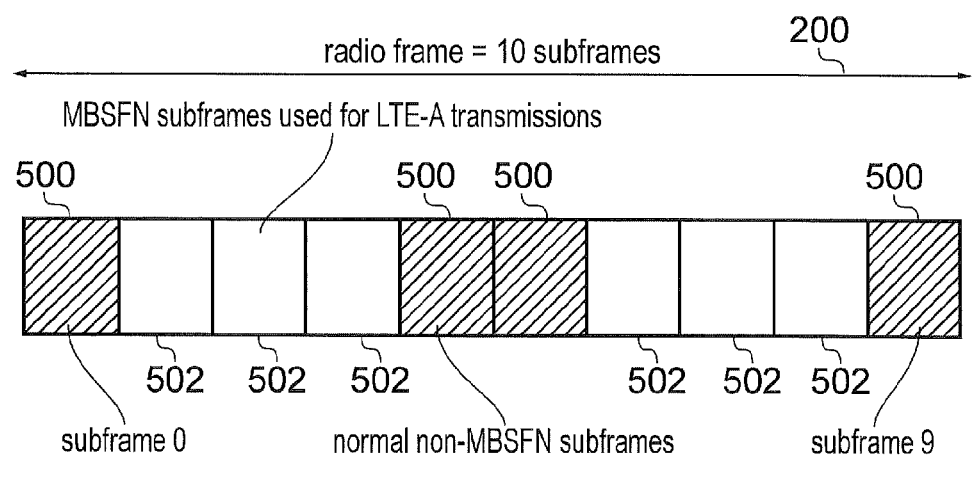
FIG. 5 provides a schematic block diagram of a frame of a wireless access interface comprising 10 subframes, some of which are configured as MBSFN subframes.

The region of the MBSFN subframe not used by the legacy control channel region can be used in a manner different to the operation of Release-8/9. When used for unicast data transmission, the region not used for the control channel region might contain only:
  PDSCH
  ePDCCH
  CSI-RS (used for performing channel state measurements, including channel quality indication (CQI) measurements)
  Demodulation reference symbols (DMRS) for PDSCH and ePDCCH FIG. 4 provides a schematic representation of a subframe as shown in FIG. 2 which includes CSI-RS. The subframe illustrated in FIG. 4 provides an example of a subframe of MBSFN type and includes CRS 400 within a conventional control channel region 402 shown with darker shading. Also shown within the subframe are communications resource elements allocated for the transmission of CSI-RS 404 and DMRS 406. These resource elements are therefore pre-allocated and cannot be used for PDSCH or ePDCCH transmission, because these resource elements are used by the scheduled or other communications devices for other decoding functions (such as channel estimation). As shown in FIG. 5, not all subframes can be allocated as MBSFN subframes. Some subframes need to remain as "normal subframes" in order to allow for synchronization signals, paging occasions and to ensure that sufficient cell-specific reference signals (CRS) are available for decoding the broadcast system information. FIG. 5 provides an example of a radio frame 200 which is sued for transmitting normal and MBSFN subframes. As shown in FIG. 5 darker shaded subframes (numbered 0, 4, 5, 9) 500 are allocated as normal non-MBSFN subframes, whereas light-shaded subframes 502 are allocated as MBSFN subframes. According to a conventional arrangement, the eNodeB signals which subframes are used as MBSFN subframes using SIB2 in system information signaling. FIG. 5 corresponds to an example of an existing LTE standard in which the eNodeB allocates a maximum number of subframes as MBSFN subframes.

Channel State Information Reference Signals (CSI-RS)

For the example of channel state information reference signals, which are allocated to communications resource elements within a subframe, the number of resource elements used for CSI-RS per physical resource block depends on the number of antenna ports used by the eNodeB. For example, two antenna ports require two resource elements which are for CSI-RS, whereas four antenna ports require the use of four resource elements for CSI-RS and eight antenna ports require eight resource element used for CSI-RS. The eNodeB can also define some "zero power CSI-RS" to a UE. These "zero power CSI-RS" are not used for transmission of CSI-RS to a UE, but allow a UE to understand that certain resource elements are "reserved" as they are to be used to signal CSI-RS to other UEs.

The location of the CSI-RS depends on the CSI-RS configuration, which is signalled to the UE.

Figure 6:
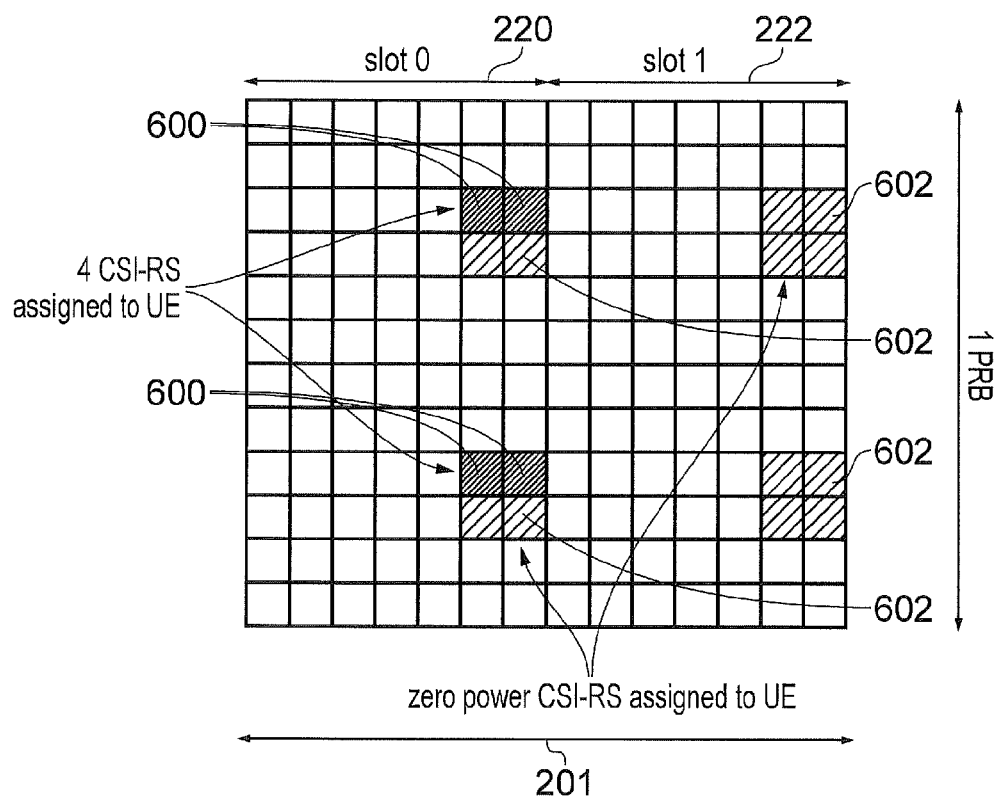
FIG. 6 is schematic representation of a subframe, which is configured to include channel state information reference symbols (CSI-RS) for an eNodeB transmitting using four antenna ports.

FIG. 6 shows an example subframe containing CSI-RS for an eNodeB, which transmits via the wireless access interface using four antenna ports. As far as the UE is concerned, the subframe contains four resource elements that are used for active CSI-RS, so that the UE could use these CSI-RS for performing channel measurements for the purposes of providing channel state information feedback signalling to the eNodeB. The UE is also informed of 12 more zero-power CSI-RS locations. These locations might be used by the eNodeB to provide CSI-RS to other UEs.

An example subframe 200 which contains CSI-RS for an eNodeB transmitting signals using four antenna ports is shown in FIG. 6. As shown in FIG. 6, a subframe 200 is shown with two time slots 220, 222 and within each of the timeslots 220, 222 of the subframe 204, CSI-RS are transmitted 600 and zero power CSI-RS 602 are also reserved within the subframe.

The CSI-RS configurations are signalled to the UE in a UE-specific way, for which each UE receives its own radio resource control (RRC) message informing the UE of a CSI-RS configuration. Typically the same CSI-RS resource elements would be used by all UEs in a cell, but the UE specific signalling allows greater flexibility at the eNodeB for some advanced features, such as, for example "shared-cell heterogeneous deployments", for example "4G LTE/LTE-Advanced for Mobile Broadband" by E. Dahlman et al [7].

For the example of release-10, or later release UEs, these UEs know of the locations of the CSI-RS. For these UEs, UE specific PDSCH is only mapped to resource elements that do not contain CSI-RS. In this case, the eNodeB and the UE rate match using knowledge of the CSI-RS locations, that is to say that a rate matching process in which message units are transmitted repeatedly is arranged to avoid the communications resource elements in which the CSI-RS are transmitted. For the example of Release-8 or Release-9 UEs, the eNodeB still transmits the CSI-RS, but the eNodeB does not rate match according to the resource elements used by CSI-RS. Instead the eNodeB rate matches, effectively by disregarding the CSI-RS, and punctures the PDSCH on the symbols occupied by the CSI-RS. In resource elements containing CSI-RS rather than PDSCH (due to PDSCH puncturing), the UE inputs resource elements containing CSI-RS to the PDSCH decoding function. If the coding and modulation applied to the PDSCH is sufficiently robust, then errors introduced by the absence of expected data and by the presence of the CSI-RS can be corrected by the UE.

In contrast to pre-Release-11 LTE releases, which include a conventional control channel, such as a wideband PDCCH, the ePDCCH is is a Release-11 control channel feature for LTE Release-11 UEs are aware of the existence of CSI-RS, and accordingly, the eNodeB and UE are able to rate match based on the known CSI-RS locations and are therefore able to avoid communications resource elements which are allocated to carry CSI-RS.

Figure 7:
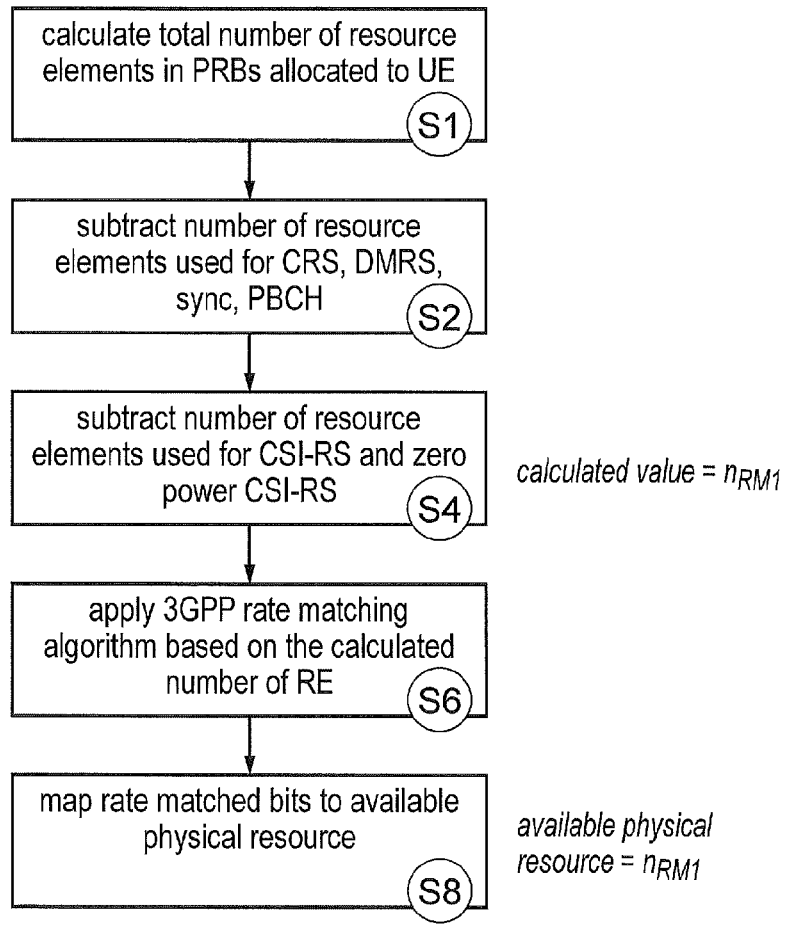
FIG. 7 is an illustrative flow diagram providing a representation of an example operation of rate matching transmission in subframes containing CSI-RS and DMRS.

FIG. 7 shows a flow chart of the operation of rate matching when applied to subframes containing CSI-RS. This operation as represented by the flow chart of FIG. 7 would be applied to UE-specific PDSCH channels for Release-10 (or later) UEs and to the ePDCCH channel. FIG. 7 represents a process for rate matching in accordance with the present technique and is summarised as follows:

S1: The eNodeB first calculates the total number of resource elements within a physical resource block which are allocated to a UE.

S2: The eNodeB subtracts the number of resource elements which are used for purposes other than carrying data or signaling from the eNodeB to a UE, such as CRS, DM-RS synchronization and PDCCH. The rate matching algorithm that is applied to FIG. 7 could be for example as disclosed in:

TS36.213 [2] section 5.1.4.1, for the PDSCH
TS36.212 [3] section 5.1.4.2, for the ePDCCH The contents of TS36.212, sections 5.1.4.1 and 5.1.4.2 are incorporated herein by reference.

S4: The controller within the eNodeB then subtracts the number of resource elements which are used for other purposes and therefore cannot be used for transmission of a message and a repeated message, from resource elements which are available for transmitting message units.

S6: The controller then applies a rate matching algorithm based on the number of calculated resource elements which are available from step S4 to determine the set of systematic and parity bits (produced e.g. by a Turbo coder or convolutional coder) that are to be actually transmitted.

S8: The set of $n_{RM1}$ systematic and purity bits are then physically mapped to the resources available in the transmission (the available resources having been previously calculated as consisting of $n_{RM1}$ physical bits: e.g., $n_{RM1}/2$ QPSK modulation symbols).

Figure 8:
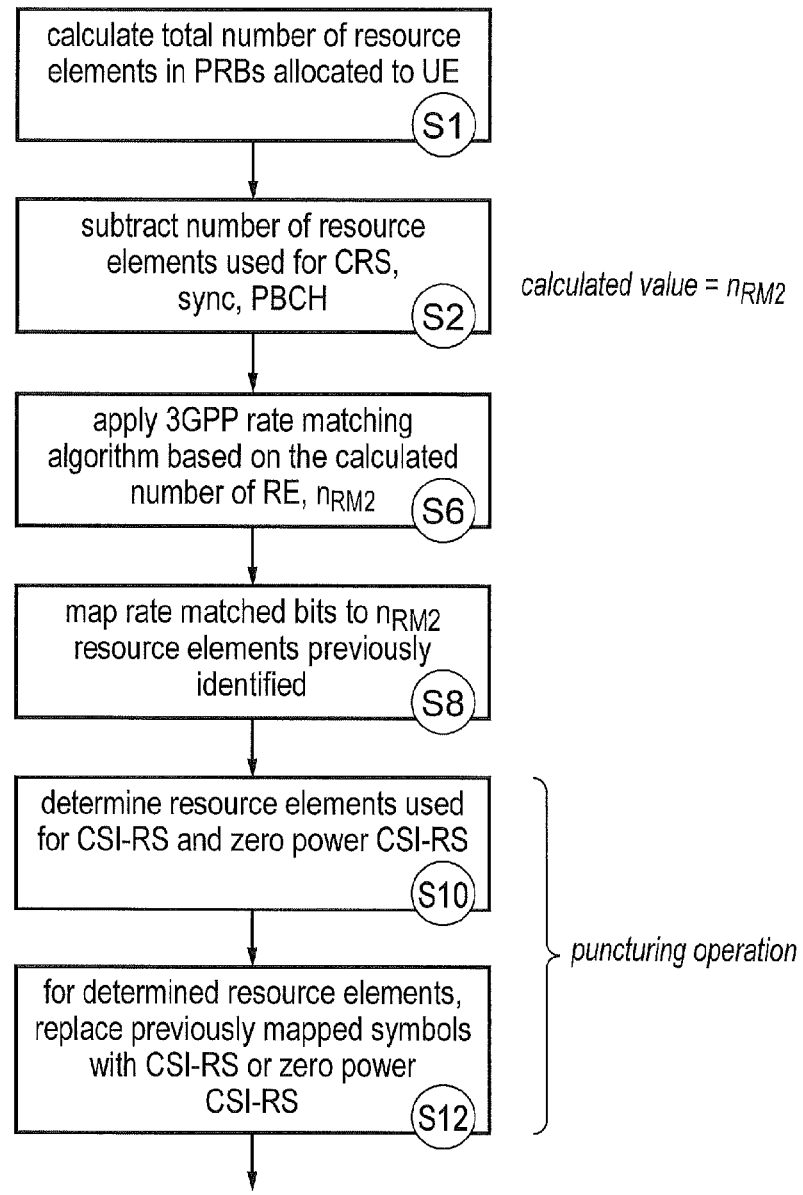
FIG. 8 is an illustrative flow diagram providing a representation of another example operation of rate matching transmission in subframes containing CSI-RS.

In contrast to the rate matching operation shown in FIG. 7, FIG. 8 provides a flow chart summarising a rate matching process performed by a controller in the eNodeB in which CSI-RS are contained within a subframe and the processing is performed for UEs which are unaware of the concept of CSI-RS (these are termed "legacy UEs" and in the context of the LTE specifications, an example of a legacy UE in this context would be a Release-8 or Release-9 UE). A difference between the process represented by the flow diagram shown in FIG. 7 and that shown in FIG. 8 is that at step S10 the controller determines the communications resource elements which are used for CSI-RS and zero power CSI-RS. Accordingly at step S12 the controller replaces the PDSCH modulation symbols mapped to those resource elements with CSI-RS modulation symbols or with zero-power CSI-RS: this operation acts to puncture the PDSCH transmission. Accordingly the transmission of the communications resource elements of the message units using the communications resource elements identified in accordance with a predetermined pattern are punctured by the presence of CSI-RS as explained above.

ePDCCH Structure

Figure 9:
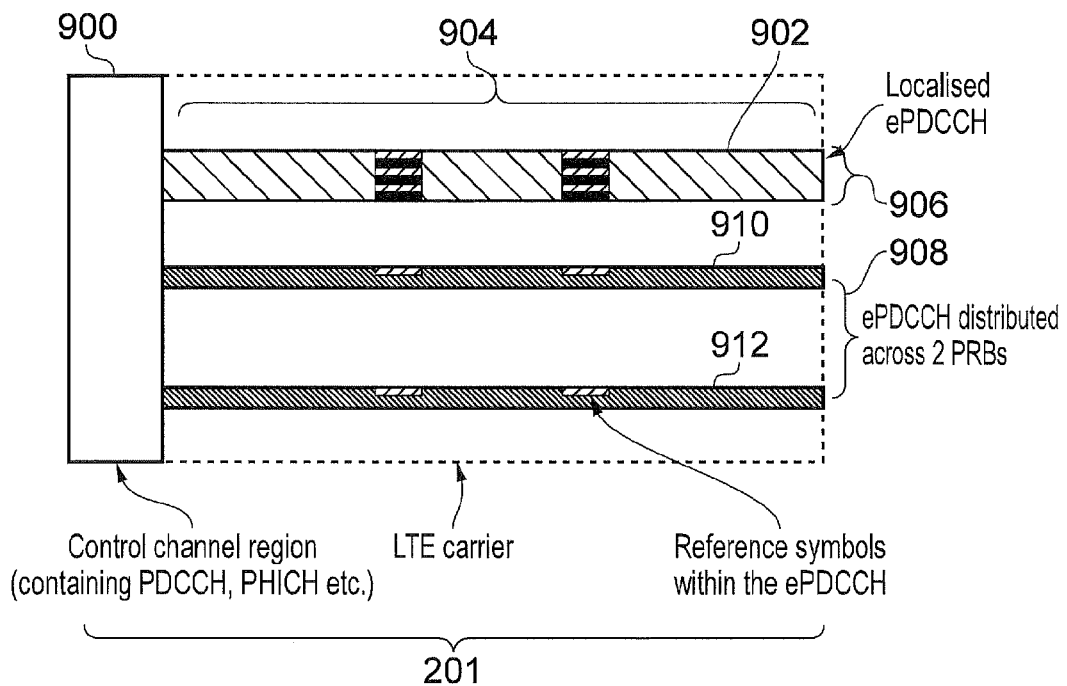
FIG. 9 is a schematic representation of a subframe of a wireless access interface, which includes a localised ePDCCH and a distributed ePDCCH.

FIG. 9 provides a schematic representation of a subframe in which an ePDCCH forms part of a wireless access interface according to an LTE standard. As shown in FIG. 9 a conventional control channel region 900 is shown within a subframe 200 which is transmitted is in the first of the 1 to 3 sub-carriers of the subframe 200. This example control channel may comprise a conventional PDCCH 900 and is transmitted across the available bandwidth of the wireless access interface. In contrast, a localised enhanced PDCCH 906 is transmitted in time across the remaining part of the subframe 904 within a narrow band of frequency sub-carriers 906. An alternative example of an ePDCCH 908 comprises a first part 910 transmitted across a first group of frequencies and a second part 912 transmitted in the second group of frequencies so that the ePDCCH is distributed across two physical resource blocks.

A wireless access interface according to an LTE standard provides for the transmission of non-access stratum data, such as user data, on the PDSCH on the downlink and on the PUSCH in the uplink. Communications resource elements on the PDSCH and PUSCH are allocated to the UE by the eNodeB. Prior to 3GPP Release-11, the PDCCH was used to allocate these channels. From Release-11, it has also been possible to allocate these channels using an enhanced PDCCH (the ePDCCH). Therefore, effectively for the example shown in FIG. 9, control channel information can be transmitted either on the PDCCH 900 (e.g. for pre-Release-11 UEs) or the ePDCCH (for UEs of release 11 or later) 902, 908 using any of the arrangement of the control channel arrangements shown in FIG. 9.

As can be appreciated from FIG. 9, the ePDCCH is essentially a narrowband control channel. As shown in FIG. 9, the ePDCCH can be transmitted in either a localized mode as shown for the first example 902 or in a distributed mode as shown for the second example 908. For the example of a localised mode of allocation, the ePDCCH can occupy a single PRB (physical resource block=12 OFDM subcarriers). It can also occupy a contiguous set of plural PRBs. When the eNodeB has knowledge about the channel conditions of the UE, it can choose a PRB that has particularly favourable channel conditions for the UE (e.g. avoiding fades). the eNodeB can also choose a beamforming codebook entry to produce a beam that is targeted at that UE.

In a distributed mode of allocation, the ePDCCH occupies at least two PRBs. This mode of allocation is preferable when the eNodeB does not have measurements or an indication representing radio channel conditions at the UE. This might occur for example if the UE is operating at a high speed, such that, for example, feedback from the UE is out of date when it arrives at the eNodeB, or a dedicated beam from the eNodeB cannot track a UE's position quickly enough, or when feedback from the UE is intermittent, for example when the UE is operating with a low data rate bursty traffic model.

Figure 10:
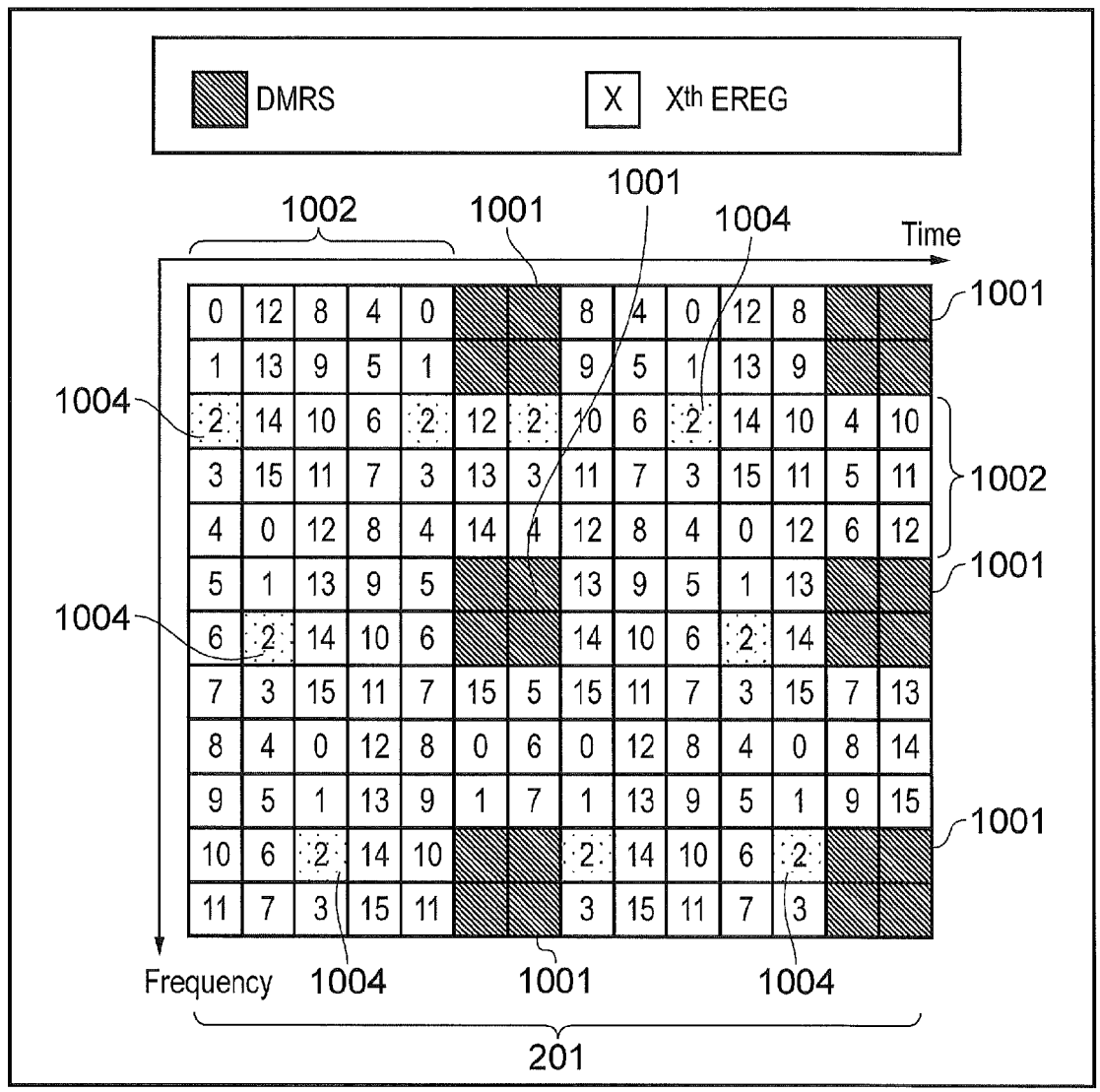
FIG. 10 is a schematic representation of a subframe, which illustrates a mapping of resource elements to enhanced resource element groups for different purposes.

FIG. 10 provides a schematic representation of a mapping of enhanced resource element groups provided within a subframe 200, which can be found in [3]. In FIG. 10 a mapping between enhanced resource element groups (EREGs) and resource elements (REs) is shown for a frequency division duplex arrangement. Resource elements which are dedicated for transmitting DMRS 1001 are shown as dark shaded blocks, whereas non-shade elements numbered 1 to 15 1002 are allocated for transmitting of ePDCCH to UEs. Lightly shaded elements 1004 numbered 2 are nine resource elements that belong to EREG 2.

An allocation message on an ePDCCH is physically transmitted using ECCEs (enhanced control channel element). An ECCE is comprised of four or eight EREG (usually four EREG). The number of ECCE used in the ePDCCH can depend on channel conditions (in poor channel conditions, more ECCEs are used to form the ePDCCH in order to provide greater redundancy and hence more resilience). An example ePDCCH might use two ECCEs where each ECCE comprises 4 EREG. In this case a total of 8 EREG are used. Hence the ePDCCH in question would comprise all those RE 1004 in FIG. 10 that are numbered between 0 and 7 (inclusive). FIG. 10 is particularly applicable to localized modes of transmission.

The ePDCCH takes account of various features for a subframe in which it is formed with the wireless access interface [4] (as partially described in 3GPP TS36.211 section 6.8A.5). For example an ePDCCH is arranged to be compatible with the following other allocation of resource elements:
- DMRS. The mapping of resource elements to EREG shown in FIG. 10 means that the resource elements used for DMRS are automatically not used for ePDCCH.
- CRS. Any resource element that is nominally mapped to ePDCCH (from FIG. 10), but that is coincident with a CRS location is not included in the resource elements mapped to ePDCCH.
- CSI-RS/zero-power CSI-RS. As for CRS, resource elements coincident with a CSI-RS/zero-power CSI-RS location are not included in the resource elements mapped to ePDCCH.
- PSS/SSS/PBCH. If a PRB contains PSS/SSS/PBCH, a rule states that that PRB cannot also contain ePDCCH.
- Control channel region (PDCCH, PHICH, PCFICH). ePDCCH is not mapped to any resource elements in OFDM symbols occupied by PDCCH, PHICH or PCFICH (the legacy control channel region). The extent of the legacy control channel region can be signaled by the eNodeB, indicating a starting OFDM symbol for the ePDCCH.

Figure 11:
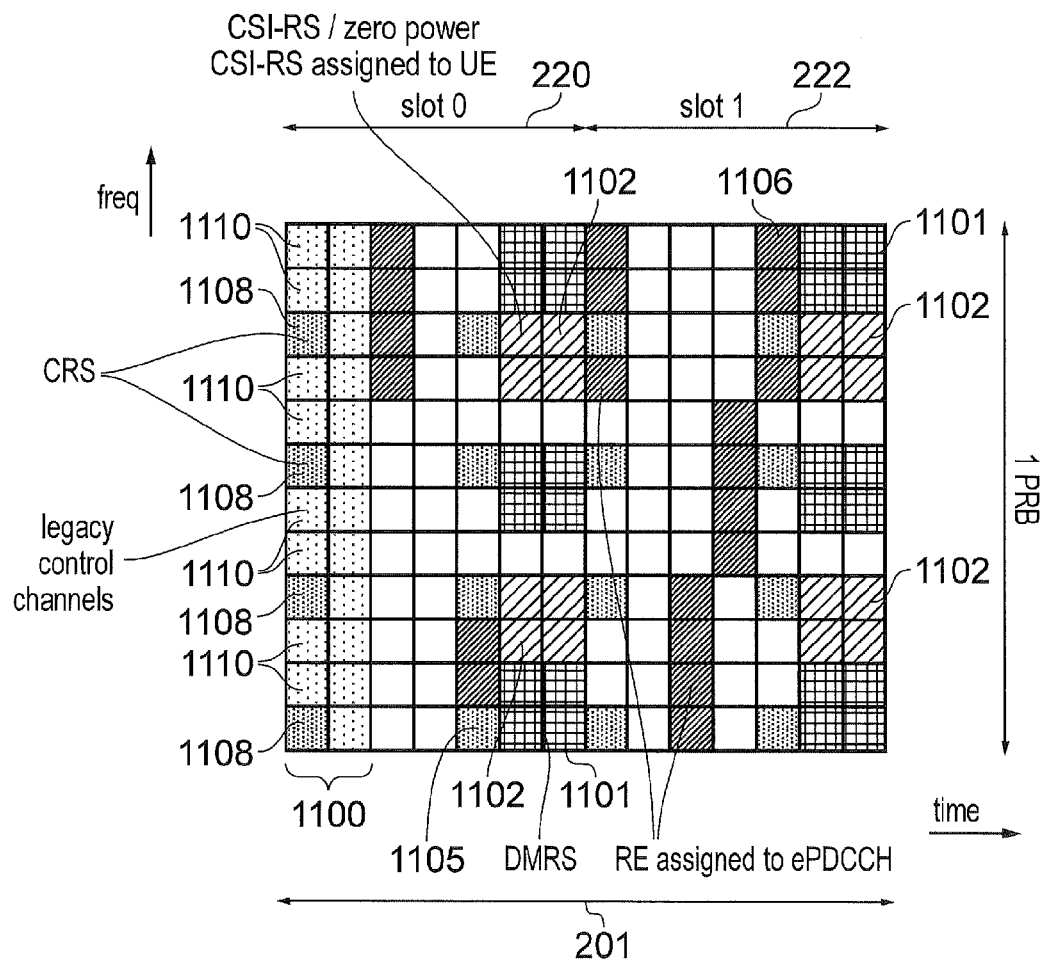
FIG. 11 is schematic representation of a subframe, which is configured to include an ePDCCH as well as an allocation of resource elements for other purposes such as cell-specific reference symbols (CRS), a conventional PDCCH, DMRS and CSI-RS.
Figure 12:
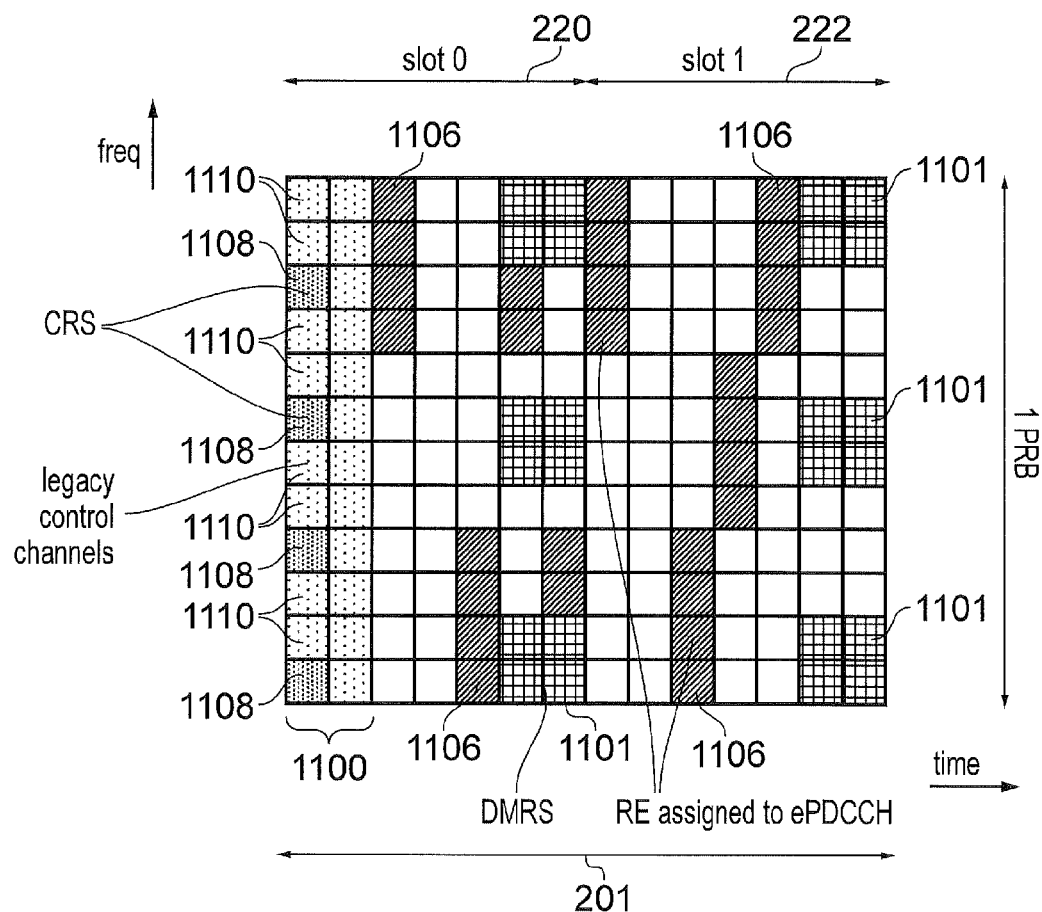
FIG. 12 is schematic representation of a subframe of "MBSFN type", which is configured to include an ePDCCH but does not support CRS in the MBSFN region, and does not support CSI-RS.

FIGS. 11 and 12 provide schematic representations of subframes providing a resource element mapping for an ePDCCH formed in a single physical resource block (PRB) of an LTE wireless access interface, which may for example be used for a localised transmission and consisting of a single eCCE using eREG 0, 1, 2, 3. Also shown in FIG. 11 are CRS 1108 for two antenna ports. DMRS 1101, CSI-RS/zero-power CSI-RS 1102 for an eNodeB using four antenna ports for CSI-RS, a legacy control channel region consisting of two OFDM symbols and no PSS/SSS/PBCH. For the example subframe shown in FIG. 12, ePDCCH is formed from twenty eight resource elements. As shown in FIG. 12 vertical shading elements 1101 represent resource elements allocated for DMS, whereas diagonally shaded elements 1102 are allocated for the transmission of CSI-RS or zero power CSI-RS assigned to a UE. Those communications resource elements with a dark shading 1106 are allocated to transmit the ePDCCH. The horizontally block shading elements 1108 are allocated transmission of CRS and the dimpled blocks 1110 are allocated for the transmission of a conventional PDCCH, PHICH or PCFICH. For the example shown in FIG. 11, the sub frame represents an example in which an ePDCCH comprises twenty resource elements.

In contrast to FIG. 11, FIG. 12 shows an example subframe which may form a wireless access interface, for example for an LTE-A subframe, which is configured as an MBSFN subframe. The example subframe of FIG. 12 does not contain CSI-RS and only contains CRS in the first OFDM symbol, which is consistent with the subframe being an MBSFN subframe. The subframe shown in FIG. 12 also has a conventional PDCCH control channel region 1200 consisting of two OFDM symbols, DMRS and no PSS/SSS/PBCH. Furthermore resource elements which are used to form an ePDCCH are shown with the ePDCCH formed, using a single PRB and consisting of a single eCCE using eREG 0, 1, 2, 3 in an MBSFN subframe. In correspondence to the example shown in FIG. 11, in FIG. 12 the shading of resource elements corresponds to that shown in FIG. 11 except that there are no resource elements allocated the transmission of CSI-RS or CRS.

As will be appreciated from the example subframes shown in FIGS. 11 and 12, the number of resource elements that comprise the ePDCCH may vary depending on the allocation of resource elements for other signals in the subframe. These example subframes are for illustration only and it will be appreciated that in practice, an ePDCCH would probably contain more eCCE than shown in FIGS. 11 and 12. However it will also be appreciated that even if an ePDCCH comprises more eCCE, the number of resource elements, which are available to form an ePDCCH may vary between subframes.

Example Coverage Extension Transmission of ePDCCH

Embodiments of the present technique address a technical problem associated with providing coverage extension for the transmission of message units such as data or signalling, where the resource elements available to form a communications channel for transmitting that message units varies between subframes. The following example is presented with reference to the formation of an ePDCCH, but is not limited to this channel and equally finds application to other channels such as those carrying data such as a PDSCH.

When performing coverage extension, it may not be possible to use standardised ePDCCH mapping rules in every subframe, if an ePDCCH is repeated across subframes. This is because:
- the number of resource elements assigned to ePDCCH varies as a function of the other signals also present in the subframe as shown in FIGS. 11 and 12
- the rate matching parameters for ePDCCH are based on a number of resource elements assigned to ePDCCH A list of resource elements that comprise the ePDCCH are provided in [4] (3GPP TS36.211 section 6.8A.5).

If the rate matching parameters which are being used to form an ePDCCH are different between subframes, it is not possible for a UE to repetition decode the ePDCCH between subframes. Repetition decoding is only possible if each subframe has an identical structure, for example, all the subframes used for repetition of ePDCCH are of the form of FIG. 11, or all the subframes are of the form of FIG. 12. This limitation leads to a restriction on scheduling flexibility and can reduce the capacity of coverage-enhanced ePDCCH in a cell, because there are certain sequences of subframes that cannot be used for coverage-enhanced ePDCCH.

According to the present technique a "reference subframe" is chosen for transmitting an ePDCCH and rate matching of this ePDCCH is performed according to the resource elements available for the ePDCCH in that subframe. In repeated subframes, the resource elements of ePDCCH are mapped to the same resource elements as used in the reference subframe. If a resource element in a repeated subframe is occupied by another channel or signal, the ePDCCH is punctured for that resource element.

The present technique can also be applied to transmitting data as well as control information, so that embodiments of the present technique include a PDSCH, including PDSCH carrying system information blocks (SIB). Accordingly, in the following example embodiments which refer mainly to ePDCCH, the same techniques can be applied to PDSCH.

According to the present technique therefore a controller in the eNodeB identifies a possible "reference subframe" or "reference pattern" of communications resource elements. As will be appreciated the terms reference subframe and reference pattern can be used interchangeably to define communications resource elements in a subframe which are allocated for a repeated transmission of a message unit on a control or data channel. The reference subframe/pattern may include:

the first subframe to which the repeated ePDCCH is mapped
if MBSFN subframes are configured, the reference subframe can be an "MBSFN subframe"
if CSI-RS are configured, the reference subframe can be a subframe containing CSI-RS
Combinations of the above (e.g. an MBSFN subframe containing CSI-RS)
a subframe consisting of the maximum amount of available physical resource (i.e. MBSFN subframe not containing CSI-RS)

Depending on the definition of the "reference subframe", there will be times when an ePDCCH is punctured in some subframes. There may also be resource elements in some subframes that are not mapped to the ePDCCH, which are unassigned resource elements. For example in an MBSFN subframe, the resource elements that are used for CRS and CSI-RS in a reference subframe can be unassigned or could be assigned to another channel (e.g. a Release-13 ePHICH channel).

For all SIBs up to and including SIB2, repetitions of a SIB are assumed to contain CRS. For all SIBs up to and including SIB2, SIB is only mapped to subframes which are defined as not being subframes which carry MBSFN subframes (i.e. SIB can only be mapped to subframes 0, 4, 5, 9).

Embodiments of the present technique differ from the arrangement explained above with reference to FIG. 8, because although as shown in FIG. 8 step S12, the previously proposed arrangement includes a puncturing operation, embodiments of the present technique are configured to transmit message units in repeated subframes, which can have different formats (some of the subframes are MBSFN, some have CSI-RS in them etc.). According to the present technique, a "reference subframe" or "reference pattern" of communications resource elements is identified in accordance with a rate matching process, and each of the subframes is used to transmit the one or more message units according to this reference subframe. The eNodeB then punctures the transmission of the one or message units when the communications resource elements according to the reference pattern are not available. Therefore the eNodeB maps a signal to a repeated set of subframes that are dissimilar.

Communicating a Reference Pattern of Resource Elements to a UE

The reference pattern of reference subframe, once identified by the eNodeB can be communicated to a UE in one of the following ways:

Fixed in the specifications, that is the reference pattern of communications resources for transmitting a coverage extended ePDCCH or PDSCH can be predetermined.

The reference pattern can be signalled via a master information block message MIB (this would typically take the form of "type 1"/"type 2" signalling where
  "type 1" might indicate that the reference subframe is an MBSFN subframe that does not contain CSI-RS
  "type 2" might indicate that the reference subframe is a non-MBSFN subframe (not containing CSI-RS))

The reference pattern can be signalled in a system information block SIB (such as the initial MTC SIB, SIB1 or SIB2)

The reference pattern can be deduced implicitly, for example two methods could be used:
  via attempts at blind decoding the ePDCCH
  if SIB2 indicates that MBSFN subframes exist, then the "reference subframe" is an MBSFN subframe, else it is a non-MBSFN subframe
  Both the eNodeB and the UE determine the reference subframe by determining the subframe with the maximum amount of available resource in any subframe out of a set of repeated subframes The items to be included in the definition of the reference subframe/pattern include one or more of the following items:
  MBSFN subframe/not MBSFN subframe
  CSI-RS and zero-power CSI-RS configuration
  OFDM start symbol of the narrowband region (e.g. virtual carrier)

However it will be appreciated that it may not be necessary to define the CRS locations in the reference subframe as the CRS locations can be determined from decoding PSS/SSS/PBCH during an initial cell acquisition procedure.

In the following example, it has been assumed that the OFDM start symbol of the narrowband region of an ePDCCH is known to the UE, because for example it is predetermined by pre-specifying the location of the start of the ePDCCH.

According to an example embodiment, a reference pattern can be identified from the example subframe shown in FIG. 12 based on the following identified characteristics:
  The subframe of FIG. 12 is an MBSFN subframe
  There are not CSI-RS
  The CRS are according to TM2 transmission with two antenna ports For this example a UE can thus deduce that the reference subframe consists of $n_{reference\_RE}=28$ resource elements.

When the eNodeB performs "transport channel processing" of the downlink control information (DCI) for the ePDCCH, it performs rate matching on the basis that the ePDCCH is mapped to $M_{symb}=r_{reference\_RE}=28$ modulation symbols ($M_{symb}$ is the variable used in 3GPP, e.g. 3GPPTS36.211 sec. 6.8A.5 to define the number of modulation symbols to be mapped in the "mapping to resource elements" phase of physical channel processing). Hence the eNodeB creates an ePDCCH modulation symbol stream that is 28 QPSK modulation symbols in length. This modulation symbol stream is labelled $y_0, y_1, \ldots y_{27}$.

According to an example embodiment, the controller of the eNodeB or a UE maps this modulation symbol stream to an ePDCCH that is repetition coded by a factor of eight. For this example, an ePDCCH is mapped to the set of subframes as shown in FIG. 13.

Figure 13:
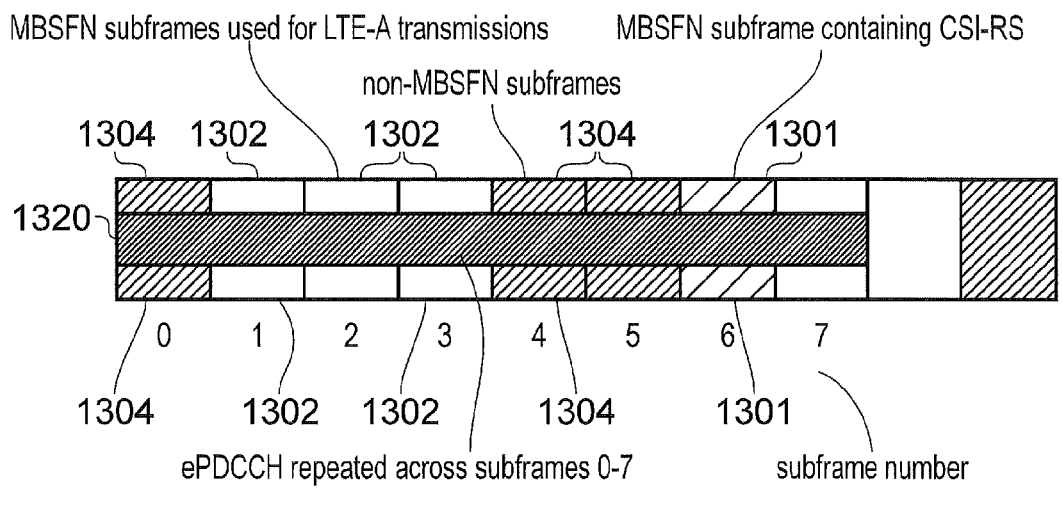
FIG. 13 is a schematic representation of a frame of a wireless access interface, which includes ten subframes and to some of which a repeated ePDCCH is mapped.

FIG. 13 provides an example representation showing an ePCCH repeated across subframes 0 to 7 of a frame. As shown in FIG. 13 hashed blocks 1301 represent MBSFN subframes containing CSI-RS whereas light shaded units 1302 represent MBSFN subframes used for LTE-A transmissions. Dark shaded units 1304 represent non-MBSFN subframes and an ePDCCH channel is shown as a dark shaded unit which crosses subframes 0-7.

Characteristics of the subframes in FIG. 13 are presented in the table below:

| Subframe number | Features |
| --- | --- |
| 0, 4, 5 | Non-MBSFN, CRS, no CSI-RS |
| 1, 2, 3, 7 | MBSFN, no CRS in data region, no CSI-RS |
| 6 | MBSFN, CRS in data region, CSI-RS |

Figure 14:
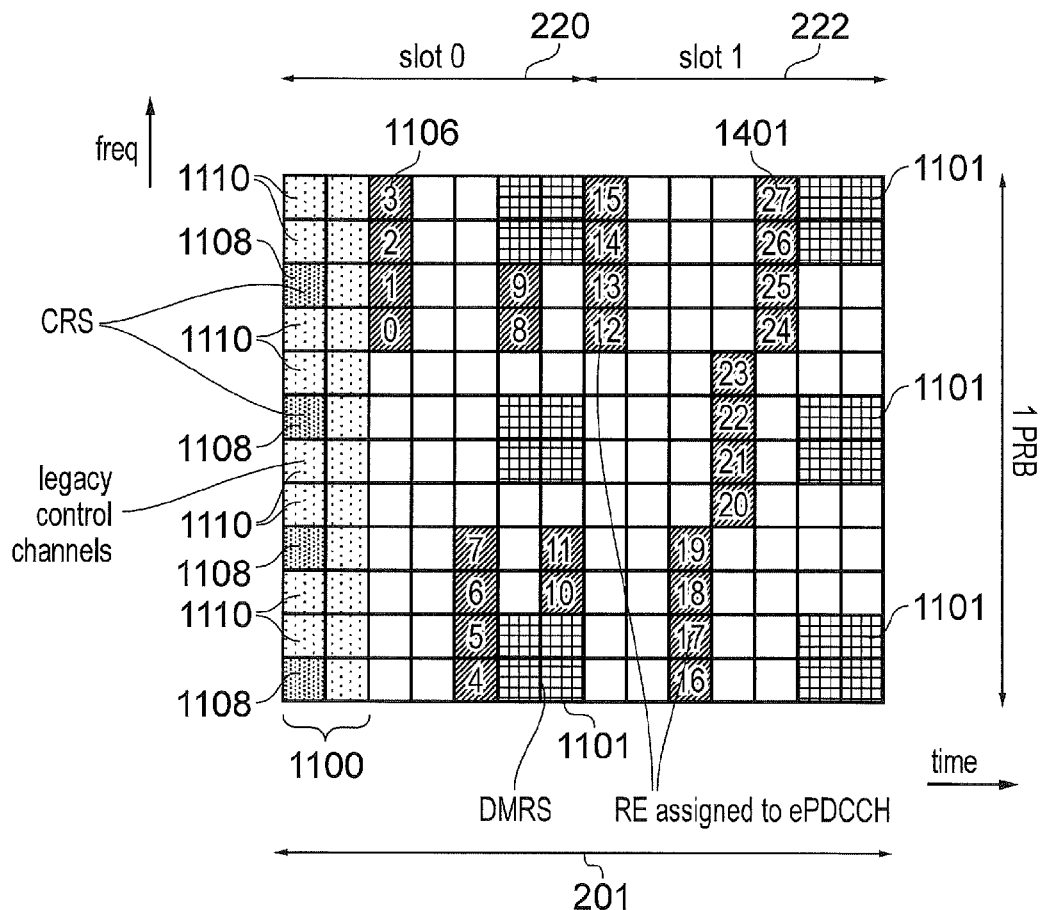
FIG. 14 is schematic representation of a subframe, which is configured to include an ePDCCH using modulation symbols of resource elements in subframes 1, 2, 3, 7 of the frame shown in FIG. 13.
Figure 15:
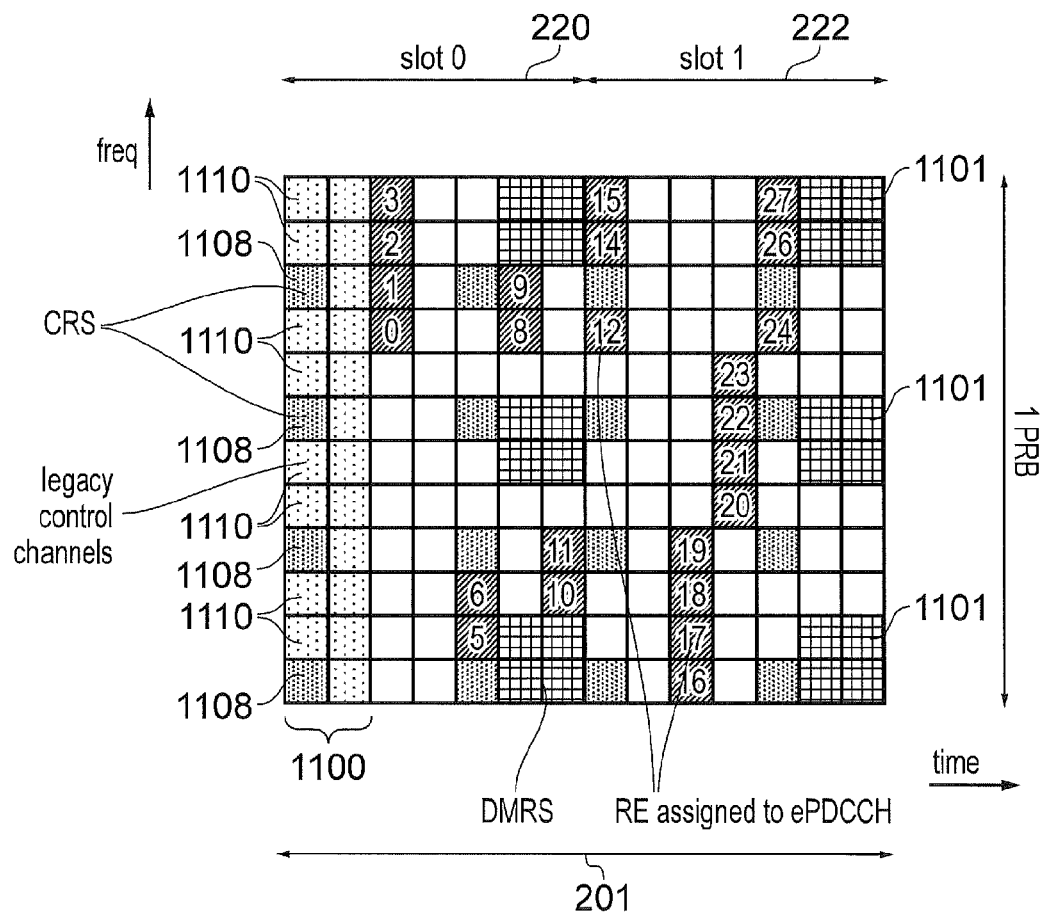
FIG. 15 is schematic representation of a subframe, which is configured to include an ePDCCH using modulation symbols of resource elements of the subframes 0, 4, 5 of the frame shown in FIG. 13.
Figure 16:
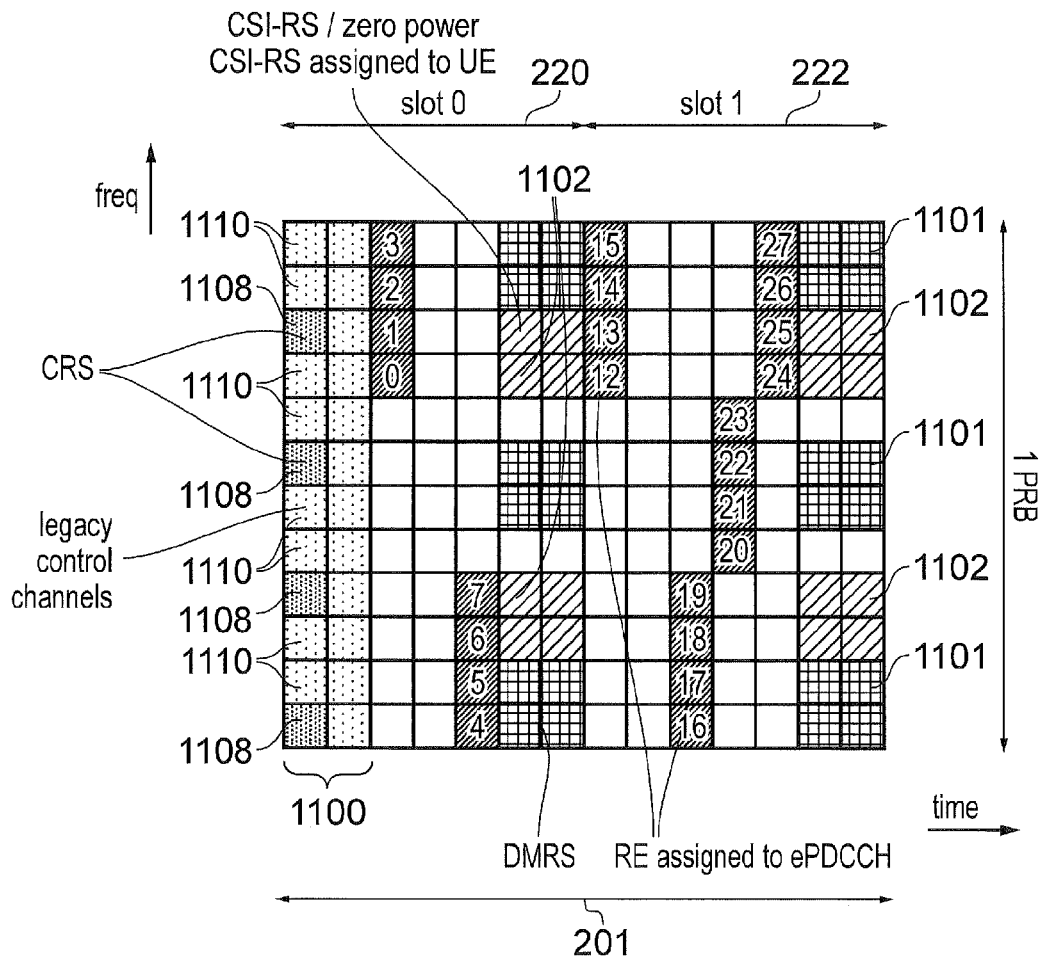
FIG. 16 is schematic representation of a subframe, which is configured to include an ePDCCH using modulation symbols of resource elements for subframe 6 of the frame shown in FIG. 13.

FIGS. 14, 15 and 16 provide graphical representations of different subframes which correspond to the subframe example representations shown in FIGS. 11 and 12. However in the examples shown in FIGS. 14, 15 and 16, the allocation of the ePDCCH resource elements is shown as dark shaded blocks with numbers between 0 and 27. In FIG. 14 the numbered reference numerals represents a reference pattern. FIG. 14 shows a mapping of ePDCCH modulation symbols $y_0, y_1, \ldots y_{27}$ to resource elements for subframes 1, 2, 3, 7 (this is the "reference subframe" in this example: an MBSFN subframe that does not contain CSI-RS). In this case, twenty eight modulation symbols are mapped by the eNodeB controller to resource elements and none get punctured. For each modulation symbol $y_i$, the value of "i" is indicated as the numbered block which is dark shaded 1401.

In FIG. 15 the example subframe is punctured by the transmission of CRS signals. For example resource element 25 of the ePDCCH is punctured 1501 and so is not transmitted. FIG. 15 shows the mapping of ePDCCH modulation symbols $y_0, y_1, \ldots y_{27}$ to resource elements for subframes 0, 4, 5 (non-MBSFN subframes). In this case, 24 modulation symbols get mapped to resource elements and four get punctured.

In contrast in FIG. 16 which contains the transmission of CSI-RS 1601 then resource elements numbered 8, 9, 10 and 11 are punctured for the transmission of the ePDCCH in this subframe as a result of the presence of the CSI-RS resource elements. FIG. 16 shows the mapping of ePDCCH modulation symbols $y_0, y_1, \ldots y_{27}$ to resource elements for subframe 6 (an MBSFN subframe containing CSI-RS and zero-power CSI-RS). In this case, 24 modulation symbols get mapped to resource elements and four get punctured, but note that the modulation symbols that get punctured are different to the ones that get punctured in subframes 0, 4 and 5. In this example, a total number of repetitions for the various modulation symbols $y_i$, are presented in a table shown in FIG. 17.

Alternative Embodiments

According to the present technique there are a number of alternative aspects and arrangements. A first example provides an implicit arrangement for defining the subframes in which the ePDCCH is transmitted for coverage extension. For example, if the start subframe of ePDCCH is an MBSFN subframe, then ePDCCH only occupies MBSFN subframes. If the start subframe of ePDCCH is a non-MBSFN subframe, then ePDCCH only occupies non-MBSFN subframes. Communications resource elements allocated to the ePDCCH, which coincide with CSI-RS resource elements are punctured in subframes containing CSI-RS. A disadvantage of this example is that it takes longer to transmit an ePDCCH, because not all subframes are of the same type. From an eNodeB perspective, this example aspect is more difficult to schedule, because scheduling can only start in subframes of the appropriate type and there may be further restrictions that apply when the system operates in a half-duplex mode. From a UE perspective, this idea is simpler to decode, because every subframe has the same structure. This example provides a simple and robust scheduling arrangement, but has a lower throughput than providing an arrangement in which an ePDCCH is transmitted in every subframe. According to this example embodiment therefore the controller is configured to identify the reference pattern as being a time unit from one or more of a plurality time units in a sequence of a plurality of time units of a time frame of a predetermined type, the type being for example MBSFN subframes or non-MBSFN subframes.

A second example aspect of the present technique provides an arrangement in which a controller in the eNode is configured to rate match to a minimum amount of physical resource in any of the repeated subframes and repeat modulation symbols, which could cycle through repeated bits from subframe to subframe. This example aspect is likely to have lower performance since the system will be operating at a higher coding rate and less coding gain may be achieved. Furthermore the controller may be required to implement a complicated mapping to determine how to repeat modulation symbols in and between subframes.

A further alternative aspect of the present technique is to arrange for the controller in the eNodeB to rate match to a first subframe of a coverage extended repeated ePDCCH, which is thus defining that the reference pattern or subframe is defined as the first subframe of a coverage extended ePDCCH. According to this arrangement performance will be worse when the first subframe of the repeated ePDCCH contains a small number of ePDCCH modulation symbols (e.g. the first subframe contains CRS and CSI-RS) and therefore the number of communications resource elements allocated for the ePDCCH may be smaller than could have been the case if other subframes could have been selected to define the reference pattern. However in practice, this might place some restrictions on subframes that the controller may choose to schedule the first subframe of the repeated ePDCCH. According to this example therefore the controller is configured to identify the reference pattern from a pattern of available resources provided from a reference subframe such as a first of the plurality time units in a sequence of a plurality of time units of a time frame.

Summary of Advantages

According to the present technique, mapping a coverage enhanced ePDCCH with respect to an identified reference pattern can have the following advantages:

- it can be applied to a frame structure containing subframes of different types
- there are no scheduling restrictions on which subframe is the starting subframe for the repeated ePDCCH sequence
- if the modulation symbol appears in a subframe, then it can be "symbol combined" in the receiver with the same modulation symbol in other subframes. In contrast, if the modulation symbol occupied different resource elements in different subframes, the modulation symbols could not be combined by symbol combining at the receiver, since the channel seen by each modulation symbol would be different. In this case, symbols would need to be log-likelihood ratio (LLR) combined, which is a more complex operation. As will be appreciated, being able to perform symbol combining is beneficial from a UE complexity reduction perspective.

It may be appreciated that in previously proposed methods of "transport channel processing" for DCI/ePDCCH a modulation symbol stream $y_0, y_1, \ldots y_{27}$ is produced for subframes 1, 2, 3, 7. In this example a modulation symbol stream $z_0, z_1, z_2$ for subframes 0, 4, 5 and subframe 6 is produced, where the symbols $z_i$ and $y_i$ are not necessarily the same for the same value of "i".

As will be appreciated from the above explanation an LTE carrier with subframes of different type, containing or not containing MBSFN, or containing or not containing CSI-RS, can be used to allow the ePDCCH to be repeated across multiple subframes of different types. This can provide an arrangement in which a coverage gain can be achieved while not restricting the types of subframe to which ePDCCH is mapped. Not having a restriction on subframe type reduces the amount of time required to transmit an ePDCCH in coverage extension mode.

Summary of Operation

Figure 18:
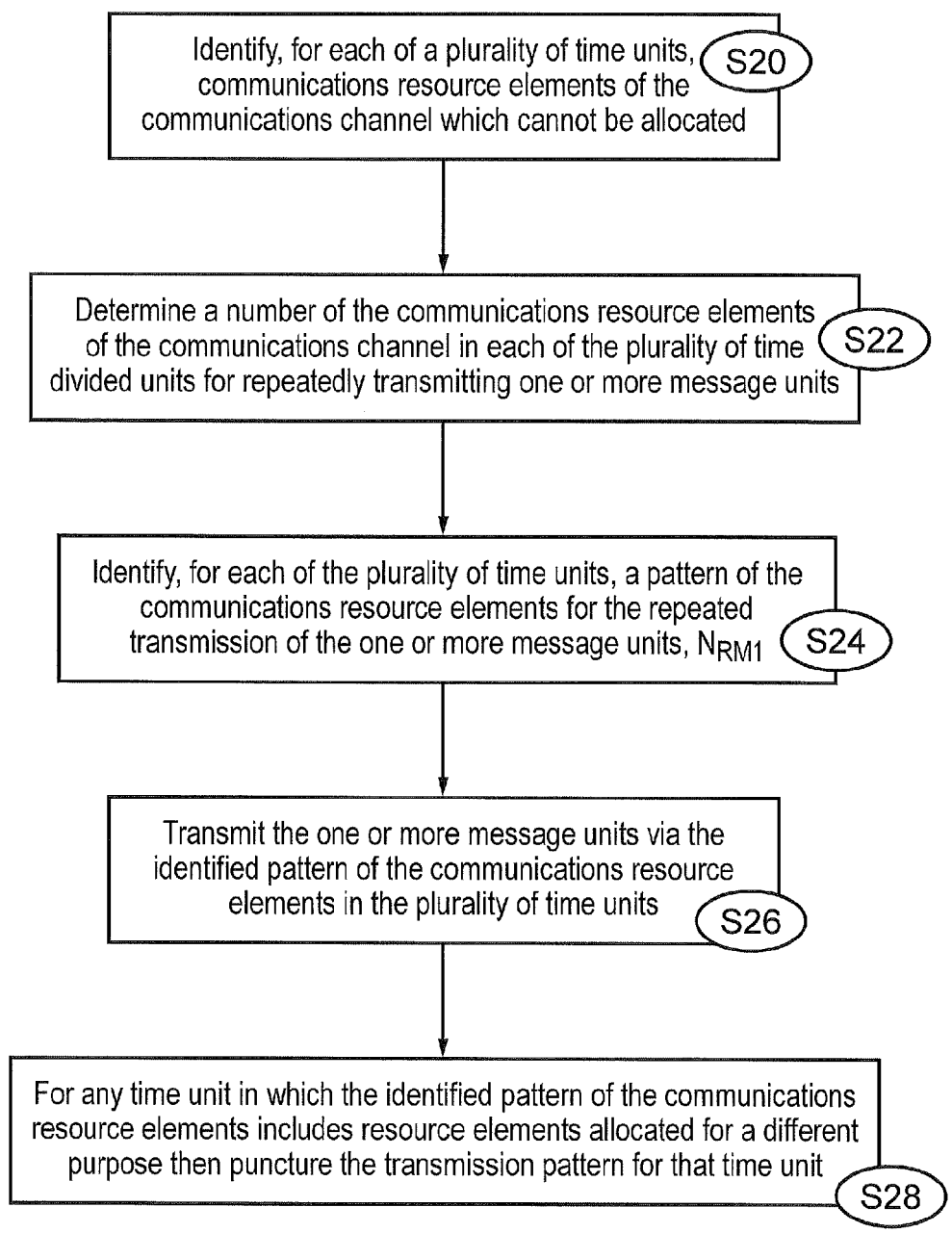
FIG. 18 is an illustrative flow diagram providing an example operation of a base station (eNodeB) in accordance with the present technique.

An example process performed by controller within an eNodeB operating in accordance with the present technique is presented in FIG. 18, which is summarised as follows:

S20: The eNodeB identifies, for each of a plurality of time units, communications resource elements of the communications channel, which cannot be used to form a physical channel to transmit messages to one of the communications devices, and therefore cannot be used to form an ePDCCH.

S22: The eNodeB then determines a number of the communications resource elements of the communications channel in each of the plurality of subframes that are to be used for repeatedly transmitting one or more message units to the communications device a plurality of times in order to achieve the required coverage extension.

S24: For each of the plurality of subframes a pattern of the communications resource elements for the repeated transmission of the one or more message units is identified. The pattern of the communications resource elements excludes the communications resource elements of the communications channel which cannot be allocated to the communications devices. The pattern of the communication resource elements may be defined according to the structure of one of the subframes of the plurality of subframes (i.e. according to a reference subframe). Based on the pattern of communication resource elements, the eNodeB can choose a common set of coded bits to transmit in each time unit (i.e. perform a rate matching function, where the coded bits are e.g. systematic and parity bits produced by a forward error correction coding function), and S26: The eNodeB transmits the one or more message units to the communications device via the identified pattern of the communications resource elements in the plurality of time units of the wireless access interface.

S28: In any subframe of the identified pattern of the communications resource elements that includes resource elements allocated for a different purposes, such as DMRS, CSI-RS or CRS then puncture the transmission pattern of those resource elements in which signals for the one or more message units for the ePDCCH would have been transmitted for that subframe.

Figure 19:
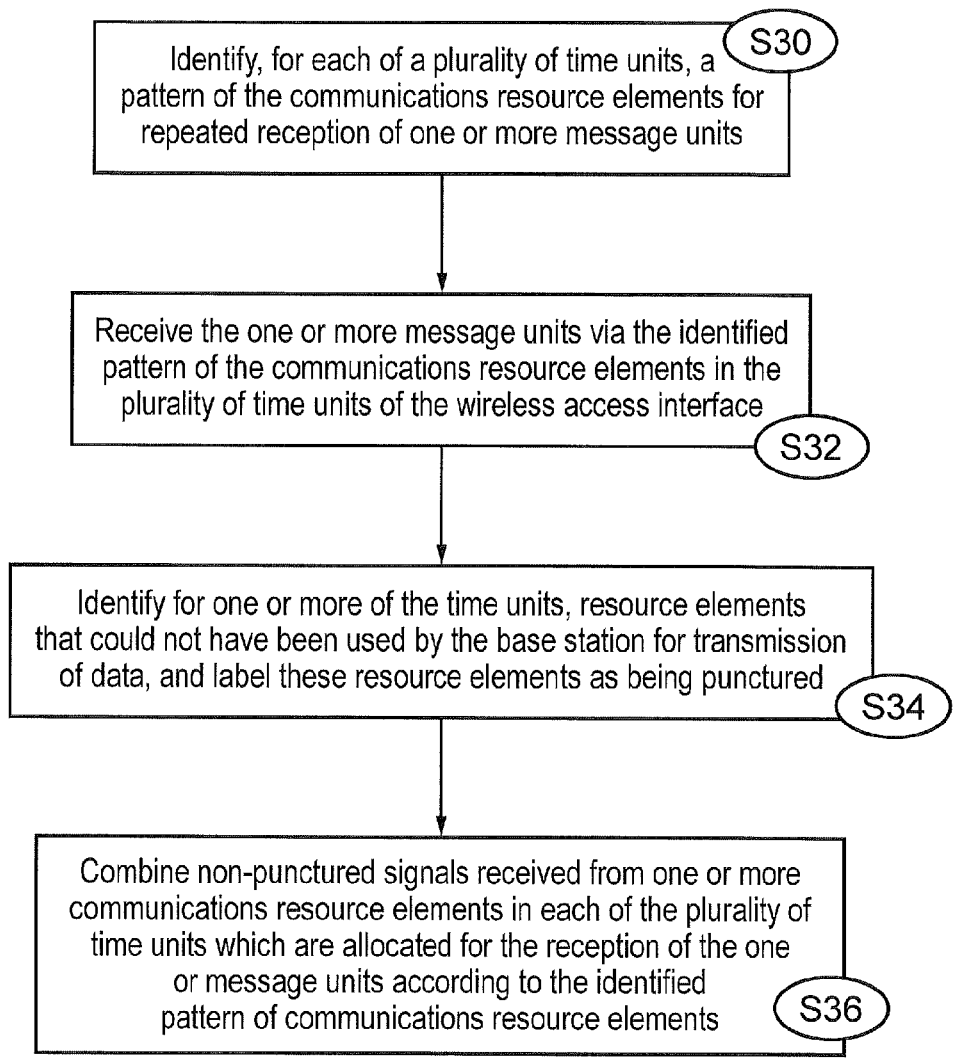
FIG. 19 is an illustrative flow diagram providing an example operation of a communications device (UE) in accordance with the present technique.

Correspondingly the operation of a UE when receiving one or more message units forming an ePDCCH for example is represented by the flow diagram shown in FIG. 19, which is summarised as follows:

S30: The UE identifies, for each of a plurality of subframes, a pattern of the communications resource elements for repeated reception of one or more message units, which form therefore, for example an ePDCCH. This may be done implicitly based upon a predetermined specification of the pattern, for example with respect to a reference pattern, or the pattern or reference pattern may be signalled by the eNodeB.

S32: The one or more message units of the ePDCCH are then received from the infrastructure equipment via the identified pattern of the communications resource elements in the plurality of subframes of the wireless access interface.

S34: If in any subframe the communications resource elements of the identified pattern are allocated for that subframe for a different purpose, then the reception is punctured in that for those communications resource elements, the signals cannot be combined with corresponding signals received for those resource elements for other subframes.

S36: The receiver then combines the communications resource elements in the subframe, which have not been punctured in step S34 for each of a plurality of subframes which are carrying the same one or more message units or parts thereof, in order to achieve a communication gain achieved by the repeated combination of the received resource elements to provide a coverage extension of the ePDCCH.

As will be appreciated from the embodiments described above, the present technique can provide an arrangement in which a reference subframe is identified and a rate matching process is performed with respect to that subframe. The eNodeB then transmits the data according to the reference subframe or in all the other subframes, with some puncturing when required. According to embodiments of the present technique one number ($n_{RM1}$ in FIG. 18) is derived from the reference subframe and that reference number is used in each of the subframes. For example an eNodeB may schedule the transmission of data in four subframes 0, 1, 2, 3. The number of resource elements available in each subframe is as follows:

Subframe 0=>20 resource elements available
Subframe 1=>28 resource elements available
Subframe 2=>24 resource elements available
Subframe 3=>25 resource elements available If we have defined subframe 1 as the "reference subframe", then $n_{RM1}$=28. Then the eNodeB transmits the data in the subframes 0, 1, 2 and 3, using the rate matching parameter $n_{RM1}$=28. However because 28 resource elements are not available in subframes 0, 2 and 3, then the eNodeB performs some puncturing of resource elements in these subframes (e.g. those occupied by CRS, CSI-RS). A rate matching functional block may take into consideration the modulation applied as well as the number of available resource elements available when performing the actual rate matching algorithm.

Various further aspects and features of the present invention are defined in the appended claims and various combinations of the features of the dependent claims may be made with those of the independent claims other than the specific combinations recited for the claim dependency. Modifications may also be made to the embodiments hereinbefore described without departing from the scope of the present invention. For instance, although a feature may appear to be described in connection with particular embodiments, one skilled in the art would recognise that various features of the described embodiments may be combined in accordance with the disclosure.

Annex 1:

The simplified structure of the downlink of an LTE wireless access interface presented in FIG. 2, also includes an illustration of each subframe 201, which comprises a control region 205 for the transmission of control data, a data region 206 for the transmission of user data, reference signals 207 and synchronisation signals which are interspersed in the control and data regions in accordance with a predetermined pattern. The control region 204 may contain a number of physical channels for the transmission of control data, such as a physical downlink control channel (PDCCH), a physical control format indicator channel (PCFICH) and a physical HARQ indicator channel (PHICH). The data region may contain a number of physical channels for the transmission of data or control, such as a physical downlink shared channel (PDSCH), enhanced physical downlink control channel (ePDCCH) and a physical broadcast channel (PBCH). Although these physical channels provide a wide range of functionality to LTE systems, in terms of resource allocation and the present disclosure ePDCCH and PDSCH are most relevant. Further information on the structure and functioning of the physical channels of LTE systems can be found in [1].

Resources within the PDSCH may be allocated by an eNodeB to UEs being served by the eNodeB. For example, a number of resource blocks of the PDSCH may be allocated to a UE in order that it may receive data that it had previously requested or data which is being pushed to it by the eNodeB, such as radio resource control (RRC) signalling. In FIG. 2, UEI has been allocated resources 208 of the data region 206, UE2 resources 209 and UE3 resources 210. UEs in an LTE system may be allocated a fraction of the available resources of the PDSCH and therefore UEs are required to be informed of the location of their allocated resources within the PDCSH so that only relevant data within the PDSCH is detected and estimated. In order to inform the UEs of the location of their allocated communications resource elements, resource control information specifying downlink resource allocations is conveyed across the PDCCH in a form termed downlink control information (DCI), where resource allocations for a PDSCH are communicated in a preceding PDCCH instance in the same subframe. During a resource allocation procedure, UEs thus monitor the PDCCH for DCI addressed to them and once such a DCI is detected, receive the DCI and detect and estimate the data from the relevant part of the PDSCH. Each uplink subframe may include a plurality of different channels, for example a physical uplink communications channel (PUSCH) 305, a physical uplink control channel (PUCCH) 306, and a physical random access channel (PRACH). The physical Uplink Control Channel (PUCCH) may carry control information such as ACK/NACK to the eNodeB for downlink transmissions, scheduling request indicators (SRI) for UEs wishing to be scheduled uplink resources, and feedback of downlink channel state information (CSI) for example. The PUSCH may carry UE uplink data or some uplink control data. Resources of the PUSCH are granted via PDCCH, such a grant being typically triggered by communicating to the network the amount of data ready to be transmitted in a buffer at the UE. The PRACH may be scheduled in any of the resources of an uplink frame in accordance with a one of a plurality of PRACH patterns that may be signalled to UE in downlink signalling such as system information blocks. As well as physical uplink channels, uplink subframes may also include reference signals. For example, demodulation reference signals (DMRS) 307 and sounding reference signals (SRS) 308 may be present in an uplink subframe where the DMRS occupy the fourth symbol of a slot in which PUSCH is transmitted and are used for decoding of PUCCH and PUSCH data, and where SRS are used for uplink channel estimation at the eNodeB. The ePDCCH channel carries similar control information (DCI) as the PDCCH, but the physical aspects of PDCCH are different to those of ePDCCH, as discussed elsewhere herein. Further information on the structure and functioning of the physical channels of LTE systems can be found in [1].

In an analogous manner to the resources of the PDSCH, resources of the PUSCH are required to be scheduled or granted by the serving eNodeB and thus if data is to be transmitted by a UE, resources of the PUSCH are required to be granted to the UE by the eNodeB. At a UE, PUSCH resource allocation is achieved by the transmission of a scheduling request or a buffer status report to its serving eNodeB. The scheduling request may be made, when there is insufficient uplink resource for the UE to send a buffer status report, via the transmission of Uplink Control Information (UCI) on the PUCCH when there is no existing PUSCH allocation for the UE, or by transmission directly on the PUSCH when there is an existing PUSCH allocation for the UE. In response to a scheduling request, the eNodeB is configured to allocate a portion of the PUSCH resource to the requesting UE sufficient for transferring a buffer status report and then inform the UE of the buffer status report resource allocation via a DCI in the PDCCH. Once or if the UE has PUSCH resource adequate to send a buffer status report, the buffer status report is sent to the eNodeB and gives the eNodeB information regarding the amount of data in an uplink buffer or buffers at the UE. After receiving the buffer status report, the eNodeB can allocate a portion of the PUSCH resources to the sending UE in order to transmit some of its buffered uplink data and then inform the UE of the resource allocation via a DCI in the PDCCH. For example, presuming a UE has a connection with the eNodeB, the UE will first transmit a PUSCH resource request in the PUCCH in the form of a UCI. The UE will then monitor the PDCCH for an appropriate DCI, extract the details of the PUSCH resource allocation, and transmit uplink data, at first comprising a buffer status report, and/or later comprising a portion of the buffered data, in the allocated resources.

Although similar in structure to downlink subframes, uplink subframes have a different control structure to downlink subframes, in particular the upper 309 and lower 310 subcarriers/frequencies/resource blocks of an uplink subframe are reserved for control signaling rather than the initial symbols of a downlink subframe. Furthermore, although the resource allocation procedure for the downlink and uplink are relatively similar, the actual structure of the resources that may be allocated may vary due to the different characteristics of the OFDM and SC-FDM interfaces that are used in the downlink and uplink respectively. In OFDM each subcarrier is individually modulated and therefore it is not necessary that frequency/subcarrier allocation are contiguous however, in SC-FDM subcarriers are modulated in combination and therefore if efficient use of the available resources are to be made contiguous frequency allocations for each UE are preferable.

Features of the present techniques can be generally described in the following numbered paragraphs.

1. An infrastructure equipment for a mobile communications network, the infrastructure equipment comprising, a transmitter configured to transmit signals to one or more communications devices via a wireless access interface comprising a plurality of communications resource elements, and a receiver configured to receive signals from the one or more communications devices via the wireless access interface, and a controller configured to control the transmitter and the receiver to transmit the signals to the one or more communications devices and to receive the signals from the one or more communications devices, wherein the wireless access interface comprises a down-link communications channel in which each of a plurality of time divided units comprises communications resource elements in time and frequency for allocation to transmit messages to the communications devices, and the controller is configured to identify, for each of a plurality of time units, communications resource elements of the communications channel which cannot be allocated to transmit messages to one of the communications devices, to determine, with respect to one of the plurality of time units as a reference time unit, a number of communications resource elements of the communications channel for repeatedly transmitting one or more message units to the communications device a plurality of times in the reference time unit, to identify, for each of the plurality of time units, a pattern of the communications resource elements for the repeated transmission of the one or more message units, within each time unit, determined with respect to the reference time unit, the pattern of the communications resource elements for each of the plurality of time units excluding the communications resource elements of the communications channel which cannot be allocated to the communications devices, and to control the transmitter to transmit the one or more message units to the communications device via the identified pattern of the communications resource elements in the plurality of time units of the wireless access interface.

2. An infrastructure equipment according to paragraph 1, wherein the controller is configured an identify that the communications resource elements which cannot be allocated to transmit the one or more message units in each of the plurality of time units change from one time unit to another, and to identify a reference pattern of communications resource elements within the reference time unit for repeatedly transmitting the one or more message units in the reference time unit, which can be applied to transmit the one or more message units in each of the plurality of time units, to schedule the pattern of communications resource elements for transmitting the one or more messages units to the communications device, based upon the reference pattern of communications resource elements.

3. An infrastructure unit according to paragraph 2, wherein the controller is configured to allocate the communications resource elements for transmitting the one or more message units to the communications device based upon the reference pattern of communications resource elements by allocating the communications resource elements in each time frame according to the reference pattern of communications resource elements, and if for any one of the plurality of time frames one or more of the communications resource elements of the reference pattern cannot be allocated to the communications device in the time unit, then puncturing the transmission by not allocating the communications resource elements in that time unit for transmitting the one or more message units to the communications device.

4. An infrastructure equipment according to paragraph 1, 2 or 3, wherein the controller is configured to determine the number of the communications resource elements in the reference time unit for transmitting the one or more message units repeatedly in accordance with a rate matching process, and to apply the determined number of the communications resource elements to identify the pattern of communications resource elements.

5. An infrastructure equipment according to any of paragraphs 2 to 4, wherein the controller is configured with the transmitter.

to transmit an indication of the reference pattern to the one or more communications devices.

6. An infrastructure equipment according to paragraph 5, wherein the controller and the transmitter are configured to transmit the indication of the reference pattern as a system information block message.

7. An infrastructure equipment according to any of paragraphs 2 to 6, wherein the controller is configured to identify the reference pattern from one or more of the plurality time units in which there are most communications resource elements available for transmitting the one or more messages units to the communications device.

8. An infrastructure equipment according to any of paragraphs 2 to 6, wherein the controller is configured to identify the reference pattern as a first of the plurality time units in a sequence of a plurality of time units of a time frame.

9. An infrastructure equipment according to any of paragraphs 2 to 6, wherein the controller is configured to identify the reference pattern as being one or more of the plurality time units in a sequence of a plurality of time units of a time frame of a predetermined type.

10. An infrastructure equipment according to any of paragraphs 1 to 9 wherein the communications channel is a control channel, the messages transmitted on the communications channels being a control channel message.

11. An infrastructure equipment according to any of paragraphs 1 to 9, wherein the communications channel is a shared channel providing a plurality of communications resource elements for allocating to the one or more communications devices, the messages transmitted on the shared channel being datagrams.

12. A method of communicating messages from an infrastructure equipment for a mobile communications network, the method comprising, transmitting signals to one or more communications devices via a wireless access interface comprising a plurality of communications resource elements, the wireless access interface comprising a down-link communications channel in which each of a plurality of time divided units comprises communications resource elements in time and frequency for allocation to transmit messages to the communications devices, identifying, for each of a plurality of time units, communications resource elements of the communications channel which cannot be allocated to transmit messages to one of the communications devices, determining, with respect to one of the plurality of time units as a reference time unit, a number of the communications resource elements of the communications channel for repeatedly transmitting one or more message units to the communications device a plurality of times in the reference time unit, identifying, for each of the plurality of time units, a pattern of the communications resource elements for the repeated transmission of the one or more message units, within each time unit, determined with respect to the reference time unit, the pattern of the communications resource elements for each of the plurality of time units excluding the communications resource elements of the communications channel which cannot be allocated to the communications devices, and transmitting the one or more message units to the communications device via the identified pattern of the communications resource elements in the plurality of time units of the wireless access interface.

13. A communications device for communicating via a mobile communications network, the communications device comprising, a transmitter configured to transmit signals to an infrastructure equipment of the mobile communications network via a wireless access interface comprising a plurality of communications resource elements, and a receiver configured to receive signals from the infrastructure equipment via the wireless access interface, and a controller configured to control the transmitter and the receiver to transmit the signals to the infrastructure equipment and to receive the signals from infrastructure equipment, wherein the wireless access interface comprises a down-link communications channel in which each of a plurality of time divided units comprises communications resource elements in time and frequency for allocation to receiver messages from the infrastructure equipment, and the controller is configured to identify, for each of a plurality of time units, a pattern of the communications resource elements for repeated reception of one or more message units, the pattern of the communications resource elements excluding communications resource elements of the communications channel which cannot be allocated for receiving the one or more message units, and to control the receiver to receive the one or more message units from the infrastructure equipment via the identified pattern of the communications resource elements in the plurality of time units of the wireless access interface.

14. A communications device according to paragraph 13, wherein the controller is configured to identify a reference of communications resource elements for repeatedly receiving the one or more message units, and to identify the pattern of communications resource elements for receiving the one or more messages units from the infrastructure equipment based upon the reference pattern of communications resource elements.

15. A communications device according to paragraph 14, wherein the controller is configured to determine the communications resource elements in each time frame for receiving the one or more message units according to the reference pattern of communications resource elements, and if, for any one of the plurality of time frames, one or more of the communications resource elements of the reference pattern cannot be allocated to the communications device in the time unit, then puncturing the reception by not combining the signals received from the communications resource elements in that time unit for receiving the one or more message units.

16. A communications device according to paragraph 15, wherein the controller is configured in combination with the receiver to combine the signals received from one or more communications resource elements in each of the plurality of time units which are allocated for the reception of the one or message units according to the identified pattern of communications resource elements, and to puncture the combining of the signals for one or more of the time units in which one or more of the communications resource elements cannot be allocated for receiving the one or more message units.

17. A communications device according to any of paragraphs 13 to 16, wherein the controller is configured to identify the pattern of the communications resource elements for repeated reception of one or more message units, by receiving an indication of the pattern of communications resource elements for the plurality of time units from the infrastructure unit.

18. A communications device according to any of paragraphs 14 to 16, wherein the controller is configured to identify the pattern of the communications resource elements for repeated reception of one or more message units, by identifying, for each of a plurality of time units, communications resource elements of the communications channel which cannot be allocated to transmit messages to one of the communications devices, determining a number of the communications resource elements of the communications channel in each of the plurality of time divided unit for repeatedly transmitting one or more message units to the communications device a plurality of times, and identifying the reference pattern from the communications resource elements available for repeated reception of the one or more message units, the reference pattern of the communications resource elements excluding communications resource elements of the communications channel which cannot be allocated for receiving the one or more message units.

19. A communications device according to paragraph 18, wherein the controller is configured to identify the reference pattern from one or more of the plurality time units in which there are most communications resource elements available for transmitting the one or more messages units to the communications device.

20. A communications device according to paragraph 18, wherein the controller is configured to identify the reference pattern as a first of the plurality time units in a sequence of a plurality of time units of a time frame.

21. A communications device according to paragraph 18, wherein the controller is configured to identify the reference pattern as being one or more of the plurality time units in a sequence of a plurality of time units of a time frame of a predetermined type.

22. A communications device according to any of paragraphs 13 to 21, wherein the communications channel is a control channel, the message transmitted on the communications channels being a control channel message.

23. A communications device according to any of paragraphs 13 to 21, wherein the communications channel is a shared channel providing a plurality of communications resource elements for allocating to the one or more communications devices, the messages transmitted on the shared channel being datagrams.

REFERENCES

[1] LTE for UMTS: OFDMA and SC-FDMA Based Radio Access, Harris Holma and Antri Toskala, Wiley 2009, ISBN 978-0-470-99401-6.
[2] 3GPPTS36.212 sections 5.1.4.1, 5.1.4.2
[3] "Enhanced Physical Downlink Control Channel in LTE Advanced Release 11". Sigen Ye, Shin Hong Wong, Chandrika Worrall. IEE Communications Magazine, February 2013.
[4] 3GPPTS36.211
[5] 3GPPTS36.213
[6] 3GPPTR36.888
[7] 4G LTE/LTE-Advanced for Mobile Broadband" by E. Dahlman et al.

What is claimed is:

1. An infrastructure equipment for a mobile communications network, the infrastructure equipment comprising:
   a transmitter configured to transmit downlink signals to one or more communications devices via a wireless access interface comprising a plurality of communications resource elements;
   a receiver configured to receive uplink signals from the one or more communications devices via the wireless access interface; and
   processing circuitry configured to:
      control the transmitter to transmit the downlink signals to the one or more communications devices and control the receiver to receive the uplink signals from the one or more communications devices, wherein the wireless access interface comprises a communications channel in which each of a plurality of time units comprises communications resource elements in time and frequency for allocation to transmit messages to the one or more communications devices;
      identify, for each of the plurality of time units, first communications resource elements of the communications channel which cannot be allocated to transmit the messages to a communication device of the one or more communications devices;
      determine, with respect to a time unit of the plurality of time units as a reference time unit, a number of the communications resource elements of the communications channel for repeatedly transmitting one or more message units to the communications device a plurality of times in the reference time unit;
      identify, for each time unit of the plurality of time units, a pattern of the communications resource elements for a repeated transmission of the one or more message units within each time unit and determined with respect to the reference time unit, wherein the pattern of the communications resource elements for each of the plurality of time units excludes the first communications resource elements of the communications channel which cannot be allocated to the one or more communications devices; and
      control the transmitter to transmit the one or more message units to the communications device via the identified pattern of the communications resource elements in the plurality of time units of the wireless access interface.

2. The infrastructure equipment as claimed in claim 1, wherein the processing circuitry is configured to
   identify that the first communications resource elements change from one time unit to another,
   identify a reference pattern of communications resource elements within the reference time unit for repeatedly transmitting the one or more message units in the reference time unit, which can be applied to transmit the one or more message units in each of the plurality of time units, and
   schedule the pattern of the communications resource elements based upon the reference pattern.

3. The infrastructure unit as claimed in claim 2, wherein to allocate the communications resource elements for transmitting the one or more message units to the communications device based upon the reference pattern of communications resource elements, the processing circuitry is configured to
   allocate the communications resource elements in each time frame according to the reference pattern of communications resource elements, and
   if for any one of the plurality of time units one or more of the communications resource elements of the reference pattern cannot be allocated to the communications device in the time unit, then puncturing a transmission by not allocating the communications resource elements in that time unit for transmitting the one or more message units to the communications device.

4. The infrastructure equipment as claimed in claim 2, wherein the processing circuitry is configured control the transmitter to transmit an indication of the reference pattern to the one or more communications devices.

5. The infrastructure equipment as claimed in claim 4, wherein the processing circuitry is configured to control the transmitter to transmit the indication of the reference pattern as a system information block message.

6. The infrastructure equipment as claimed in claim 2, wherein the processing circuitry is configured to identify the reference pattern from one or more of the plurality of time units in which there area most communications resource elements available for transmitting the one or more messages units to the communications device.

7. The infrastructure equipment as claimed in claim 2, wherein the processing circuitry is configured to identify the reference pattern as a first of the plurality of time units in a sequence of a plurality of time units of a time frame.

8. The infrastructure equipment as claimed in claim 2, wherein the processing circuitry is configured to identify the reference pattern as being one or more of the plurality of time units in a sequence of a plurality of time units of a time frame of a predetermined type.

9. The infrastructure equipment as claimed in claim 1, wherein the processing circuitry is configured to determine the number of the communications resource elements in the reference time unit for transmitting the one or more message units repeatedly in accordance with a rate matching process, and to apply the determined number of the communications resource elements to identify the pattern of communications resource elements.

10. A method of communicating messages from an infrastructure equipment for a mobile communications network, the method comprising, transmitting signals to one or more communications devices via a wireless access interface comprising s communications channel in which each of a plurality of time units comprises communications resource elements in time and frequency for allocation to transmit messages to the one or more communications devices;

identifying, for each of the plurality of time units, first communications resource elements of the communications channel which cannot be allocated to transmit the messages to a communication device of the one or more communications devices;

determining, with respect to a time unit of the plurality of time units as a reference time unit, a number of the communications resource elements of the communications channel for repeatedly transmitting one or more message units to the communications device a plurality of times in the reference time unit;

identifying, for each time unit of the plurality of time units, a pattern of the communications resource elements for a repeated transmission of the one or more message units within each time unit and determined with respect to the reference time unit, wherein the pattern of the communications resource elements for each of the plurality of time units excludes the first communications resource elements of the communications channel which cannot be allocated to the one or more communications devices; and transmitting the one or more message units to the communications device via the identified pattern of the communications resource elements in the plurality of time units of the wireless access interface.

11. A communications device for communicating via a mobile communications network, the communications device comprising;

a transmitter configured to transmit uplink signals to an infrastructure equipment of the mobile communications network via a wireless access interface;

a receiver configured to receive downlink signals from the infrastructure equipment via the wireless access interface; and processing circuitry configured to:

control the transmitter to transmit the uplink signals to the infrastructure equipment and control the receiver to receive the downlink signals from infrastructure equipment, wherein the wireless access interface comprises a communications channel in which each of a plurality of time units comprises communications resource elements in time and frequency for allocation to receive messages from the infrastructure equipment;

identify, for each time unit of a plurality of time units, a pattern of the communications resource elements for repeated reception of one or more message units, the pattern of the communications resource elements excluding first communications resource elements of the communications channel which cannot be allocated to the communications device for receiving the one or more message units; and control the receiver to receive the one or more message units from the infrastructure equipment via the identified pattern of the communications resource elements in the plurality of time units of the wireless access interface.

12. The communications device as claimed in claim 11, wherein the processing circuitry is configured to identify a reference pattern of communications resource elements for repeatedly receiving the one or more message units, and identify the pattern of communications resource elements for receiving the one or more messages units from the infrastructure equipment based upon the reference pattern of communications resource elements.

13. The communications device as claimed in claim 12, wherein the processing circuitry is configured to determine the communications resource elements in each time frame for receiving the one or more message units according to the reference pattern of communications resource elements, and if, for any one time unit of the plurality of time units, one or more of the first communications resource elements of the reference pattern cannot be allocated to the communications device in the time unit, then puncturing reception by not combining the downlink signals received from the communications resource elements in that time unit for receiving the one or more message units.

14. The communications device as claimed in claim 13, wherein the processing circuitry is configured to combine the downlink signals received from one or more communications resource elements in each of the plurality of time units which are allocated for the reception of the one or message units according to the identified pattern of communications resource elements, and puncture the combining of the downlink signals for one or more of the time units in which one or more of the communications resource elements cannot be allocated for receiving the one or more message units.

15. The communications device as claimed in claim 12, wherein to identify the pattern of the communications resource elements for repeated reception of one or more message units, the processing circuitry is configured to identify, for each of a plurality of time units, the first communications resource elements of the communications channel which cannot be allocated to transmit messages to the one of the communications devices, determine a number of the first communications resource elements of the communications channel in each of the plurality of time divided unit for repeatedly transmitting one or more message units to the communications device a plurality of times, and identify the reference pattern from the communications resource elements available for repeated reception of the one or more message units, the reference pattern of the communications resource elements excluding the first communications resource elements of the communications channel which cannot be allocated for receiving the one or more message units.

16. The communications device as claimed in claim 15, wherein the processing circuitry is configured to identify the reference pattern from one or more of the plurality of time units in which there are a most communications resource elements available for transmitting the one or more messages units to the communications device.

17. The communications device as claimed in claim 15, wherein the processing circuitry is configured to identify the reference pattern as a first of the plurality of time units in a sequence of a plurality of time units of a time frame.

18. The communications device as claimed in claim 15, wherein the processing circuitry is configured to identify the reference pattern as being one or more of the plurality of time units in a sequence of a plurality of time units of a time frame of a predetermined type.

19. The communications device as claimed in claim 11, wherein the processing circuitry is configured to identify the pattern of the communications resource elements for repeated reception of one or more message units, by receiving an indication of the pattern of communications resource elements for the plurality of time units from the infrastructure unit.

20. The communications device as claimed in claim 11, wherein
   the communications channel is a control channel, and
   a message transmitted on the communications channels being a control channel message.

\* \* \* \* \*